(12) United States Patent
Trainham et al.

(10) Patent No.: US 9,651,313 B2
(45) Date of Patent: May 16, 2017

(54) PARTICULATE HEAT TRANSFER FLUID AND RELATED SYSTEM AND METHOD

(71) Applicant: RESEARCH TRIANGLE INSTITUTE, Research Triangle Park, NC (US)

(72) Inventors: James Arthur Trainham, Chapel Hill, NC (US); Paul G. Hoertz, Morrisville, NC (US); Christopher A. Bonino, Durham, NC (US); John S. Newman, Kensington, CA (US)

(73) Assignee: Research Triangle Institute, Research Triangle Park, NC (US)

( * ) Notice: Subject to any disclaimer, the term of this patent is extended or adjusted under 35 U.S.C. 154(b) by 216 days.

(21) Appl. No.: 14/434,546

(22) PCT Filed: Oct. 9, 2013

(86) PCT No.: PCT/US2013/064127
§ 371 (c)(1),
(2) Date: Apr. 9, 2015

(87) PCT Pub. No.: WO2014/059016
PCT Pub. Date: Apr. 17, 2014

(65) Prior Publication Data
US 2015/0316328 A1    Nov. 5, 2015

Related U.S. Application Data

(60) Provisional application No. 61/712,104, filed on Oct. 10, 2012.

(51) Int. Cl.
*F24H 3/00* (2006.01)
*F28D 20/00* (2006.01)
(Continued)

(52) U.S. Cl.
CPC ............ *F28D 20/0056* (2013.01); *C09K 5/14* (2013.01); *F03G 6/00* (2013.01); *F28D 17/005* (2013.01);
(Continued)

(58) Field of Classification Search
CPC .... F28D 20/0056; F28D 17/005; F28D 19/02; F28D 20/0034; F28D 23/00; F28D 2020/0047
(Continued)

(56) References Cited

U.S. PATENT DOCUMENTS 4,290,779 A    9/1981    Qader
4,343,602 A    8/1982    Meywald et al.
(Continued)

FOREIGN PATENT DOCUMENTS

| DE | 102 08 487 | 9/2003 |
|---|---|---|
| WO | WO 99/45329 A1 | 9/1999 |
| WO | WO 2012/052661 | 4/2012 |

OTHER PUBLICATIONS

Belov et al.; *Preparation of Spherical Yttria-Stabilized Zirconia Powders by Reactive-Spray Atomization*; Journal of the American Ceramic Society; Apr. 1997; pp. 982-990; vol. 80 No. 4.
(Continued)

*Primary Examiner* — Davis Hwu
(74) *Attorney, Agent, or Firm* — Womble Carlyle Sandridge & Rice, LLP

(57) ABSTRACT

A heat transfer system and related method of heat transfer is provided. The heat transfer system includes a tubular receiver positioned to receive heat from a heat source, the receiver comprising one or more enclosed tubes configured for gravity-driven flow of a particulate heat transfer fluid therethrough in a dense, unfluidized state having a particle volume fraction of at least about 25%; and at least one
(Continued)

storage vessel in fluid communication with the tubular receiver and positioned to receive the heat transfer fluid therefrom, wherein the particulate heat transfer fluid includes a plurality of particles of a metal-containing material having a melting point of greater than 800 C, the heat transfer fluid being substantially free of a liquid component.

55 Claims, 27 Drawing Sheets

(51) Int. Cl.

| | |
|---|---|
| *F03G 6/00* | (2006.01) |
| *C09K 5/14* | (2006.01) |
| *F28F 23/00* | (2006.01) |
| *F28D 17/00* | (2006.01) |
| *F28D 19/02* | (2006.01) |
| *F28D 21/00* | (2006.01) |

(52) U.S. Cl.
CPC ......... *F28D 19/02* (2013.01); *F28D 20/0034* (2013.01); *F28F 23/00* (2013.01); *F28D 2020/0047* (2013.01); *F28D 2020/0082* (2013.01); *F28D 2021/0045* (2013.01); *Y02E 10/46* (2013.01); *Y02E 60/142* (2013.01)

(58) Field of Classification Search
USPC .................................................. 265/47, 11.1
See application file for complete search history.

(56) References Cited

U.S. PATENT DOCUMENTS

| | | | |
|---|---|---|---|
| 4,430,279 A | | 2/1984 | Hagio et al. |
| 4,540,184 A | * | 9/1985 | Takahashi ............... F16L 41/08 165/149 |
| 4,681,022 A | | 7/1987 | Schwing |
| 4,706,737 A | * | 11/1987 | Taylor ....................... F28F 3/12 165/119 |
| 6,152,689 A | | 11/2000 | Yokota et al. |
| 6,524,088 B2 | | 2/2003 | Kasai et al. |
| 7,033,570 B2 | | 4/2006 | Weimer et al. |
| 7,438,880 B2 | | 10/2008 | Hung et al. |
| 7,588,694 B1 | | 9/2009 | Bradshaw et al. |
| 7,635,458 B1 | | 12/2009 | Hung et al. |
| 7,638,705 B2 | | 12/2009 | Venkatasubramanian |
| 7,695,705 B2 | | 4/2010 | Hung et al. |
| 7,708,974 B2 | | 5/2010 | Yadav |
| 7,713,349 B2 | | 5/2010 | Hung et al. |
| 7,758,838 B2 | | 7/2010 | Hung et al. |
| 7,776,303 B2 | | 8/2010 | Hung et al. |
| 7,997,878 B2 | | 8/2011 | Fulkerson |
| 8,109,265 B1 | | 2/2012 | Kolb |
| 8,283,271 B2 | | 10/2012 | San-Miguel et al. |
| 2007/0051634 A1 | | 3/2007 | Poole et al. |
| 2007/0254159 A1 | | 11/2007 | Schneider et al. |
| 2008/0000231 A1 | | 1/2008 | Litwin et al. |
| 2008/0011290 A1 | | 1/2008 | Goldman et al. |
| 2008/0075649 A1 | | 3/2008 | Hung et al. |
| 2009/0220698 A1 | | 9/2009 | Yadav |
| 2010/0055017 A1 | | 3/2010 | Vanier et al. |
| 2010/0233487 A1 | | 9/2010 | Millero et al. |
| 2011/0061837 A1 | | 3/2011 | Jeter et al. |
| 2011/0132144 A1 | | 6/2011 | Mezger et al. |
| 2011/0146959 A1 | | 6/2011 | Root |
| 2011/0218286 A1 | | 9/2011 | Yadav |
| 2011/0223220 A1 | | 9/2011 | Vanier et al. |

OTHER PUBLICATIONS

Bora et al.; *Free-flowing, transparent γ-alumina nanoparticles synthesized by a supersonic thermal plasma expansion process*; Current Applied Physics; 2012; pp. 1-5.

Bourlinos et al.; *Functionalized Nanostructures with Liquid-Like Behavior: Expanding the Gallery of Available Nanostructures*; Advanced Functional Material; 2005; pp. 1285-1290; vol. 15; Wiley-VCH Verlag GmbH & Co. KGaA; Weinheim.

Bourlinos et al.; *Surface-Functionalized Nanoparticles with Liquid-Like Behavior*; Advanced Materials; Jan. 31, 2005; pp. 234-237; vol. 17, No. 2; Wiley-VCH Verlag GmbH & Co. KGaA; Weinheim.

Bourlinos et al.; *Surface-functionalized nanoparticles with liquid-like behavior: The role of the constituent components*; The European Physical Journal E; 2005; pp. 109-117; vol. 20.

European Commission Project Report; *Solgate: solar hybrid gas turbine electric power system*; 2005; pp. 1-47; Office for Official Publications of the European Communities.

Fernandes et al.; *Fullerol ionic fluids*; Nanoscale; 2010; pp. 1653-1656; vol. 2; The Royal Society of Chemistry.

Flamant et al.; *Dense suspension of solid particles as a new heat transfer fluid for concentrated solar thermal plants: On-sun proof of concept*; Chemical Engineering Science; 2013; pp. 567-576; vol. 102; Elsevier Ltd.

Hellmann et al.; *Characterization of Spherical Ceramic Particles for Solar Thermal Transfer Media: A Market Survey*; Sandia Report; Oct. 1986; pp. 1-52; Sandia National Laboratories.

Hellmann et al.; *Evaluation of Spherical Ceramic Particles for Solar Thermal Transfer Media*, Sandia Report; Jan. 1987; pp. 1-51; Sandia National Laboratories.

Ho et al.; *Modeling On-Sun Tests of a Prototype Solid Particle Receiver for Concentrating Solar Power Processes and Storage*; Proceedings of the ASME 2009 3$^{rd}$ International Conference of Energy Sustainability; Jul. 19-23, 2009; pp. 543-550; San Francisco, California.

Hruby et al., *Energy—The Challenge: A Solid Particle Central Receiever for Solar Energy*; CEP; Feb. 1986; pp. 44-47.

Prakash et al.; *Mechanism of heat transport in nanofluids*; J Computer-Aided Mater Des; 2007, vol. 14, pp. 109-117; Springer Science+Media Business B.V.

Tan et al.; *Review of study on solid particle solar receivers*; Renewable and Sustainable Energy Reviews 14; 2010; pp. 265-276; Elsevier Ltd.

Wang et al.; *A Review on Nanofluids—Part II: Experiments and Applications*; Brazilian Journal of Chemical Engineering; Oct.-Dec. 2008; pp. 631-648; vol. 25, No. 4.

Wang et al., *Heat transfer characteristics of nanofluids: a review*; International Journal of Thermal Sciences; 2007; pp. 1-19; vol. 46; Elsevier Masson SAS.

Wang et al.; *Thermal Conductivity of Nanoparticle-Fluid Mixture*; Journal of Thermophysics and Heat Transfer; Oct.-Dec. 1999; pp. 474-480; vol. 13, No. 4.

* cited by examiner

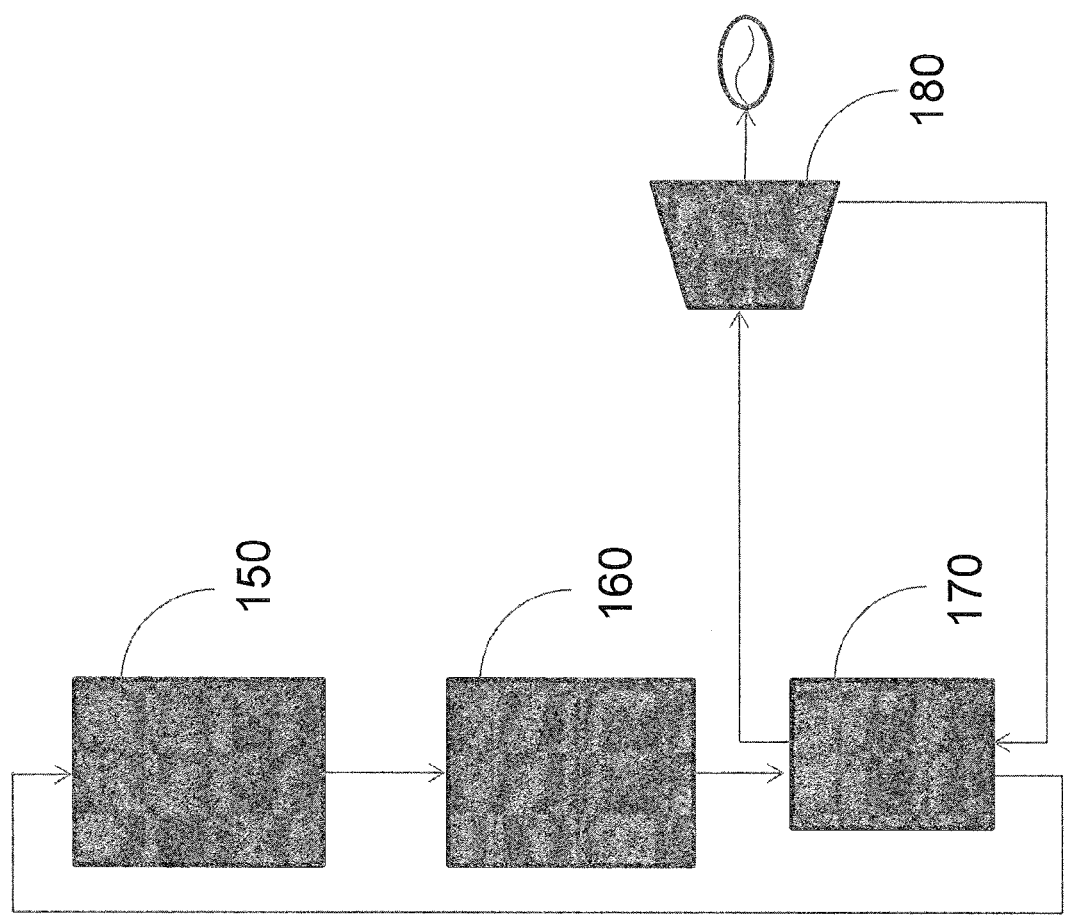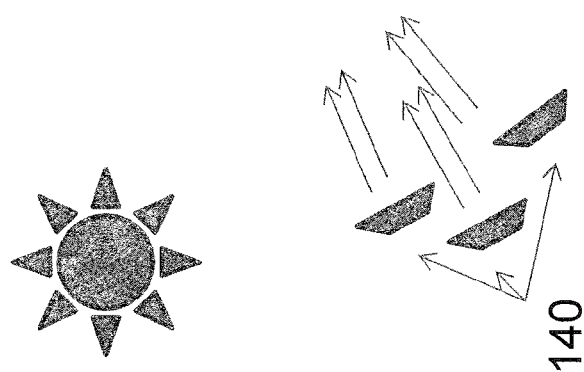
Fig. 3

| Bulk Property | Titanium Nitride | | Hexagonal Boron Nitride | | Aluminum Nitride | | Silicon Nitride | | Titanium Disilicide | | Titanium Diboride | | Boron Carbide | | Silicon Carbide | |
|---|---|---|---|---|---|---|---|---|---|---|---|---|---|---|---|---|
| Melt pt. | 2,950°C | | 2,966°C | | 2,250°C | | 1,900°C | | 1,500°C | | 2,956°C | | 2,506°C | | 2,760°C | |
| Heat capacity ($C_p$) (J/g K) | T(°C) | $C_p$ | T(°C) | $C_p$ | T(°C) | $C_p$ | T(°C) | $C_p$ | T(°C) | $C_p$ | T(°C) | $C_p$ | T(°C) | $C_p$ | T(°C) | $C_p$ |
| | 500 | 0.89 | 500 | 1.60 | 393 | 1.08 | 25 | 0.74 | 427 | 0.80 | 500 | 1.08 | 500 | 1.92 | 100 | 0.82 |
| | 1,000 | 0.90 | 927 | 2.01 | 497 | 1.10 | 1,000 | 1.20 | 727 | 0.92 | 1,000 | 1.19 | 1,000 | 2.21 | 500 | 1.12 |
| | 2,000 | 0.95 | | | 1,000 | 1.57 | | | 927 | 0.99 | 2,000 | 1.37 | 2,000 | 2.65 | 800 | 1.23 |
| Density | 5,430 kg/m³ | | 2,270 kg/m³ | | 3,240 kg/m³ | | 3,190 kg/m³ | | 4,040 kg/m³ | | 4,500 kg/m³ | | 2,060 kg/m³ | | 3,220 kg/m³ | |
| Thermal conductivity (W/m-K) | 29 (25°C) 8.4 (1,000°C) 57 (2,300°C) | | 28.7 (300°C) 26.6 (1,000°C) | | 110 (25°C) 40 (1,000°C) | | 36 (25°C) 8.0 (1,000°C) | | 40.5 (300°C) 33.4 (900°C) 29.3 (1,500°C) | | 81.0 (500°C) 78.1 (1,000°C) 77.8 (1,200°C) | | 28.8 (25°C) 82.8 (425°C) 16.0 (975°C) | | 78 (100°C) 36 (1,000°C) | |
| Thermal stability | up to 800°C (a) NA (i) | | up to 1,000°C (a) up to 2,800°C (i) | | up to 1,600°C (a) NA (i) | | up to 1,500°C (a) NA (i) | | NA (a) NA (i) | | up to 800°C (a) up to 2400°C (i) | | up to 800°C (a) up to 2450°C (i) | | up to 1,400°C (a) NA (i) | |
| Hardness | 21 GPa | | 1–2 (Mohs) | | 12 GPa | | 17 GPa | | 9.6 GPa | | 30 GPa | | 40 GPa | | 26 GPa | |

(a): air, (i): inert, NA: not available

Fig. 26

| Bulk Property | Silicon Dioxide | Titanium Dioxide | γ-Aluminum Oxide | Magnesium Oxide |
|---|---|---|---|---|
| Melt pt. | 1,713°C | 1,843°C | 2,053°C | 2,825°C |
| Heat capacity ($C_p$) (J/g K) | T(°C)  $C_p$<br>500  1.27<br>1,000  1.22<br>2,000  1.25 | T(°C)  $C_p$<br>500  0.9<br>1,000  0.96<br>2,000  0.99 | T(°C)  $C_p$<br>227  1.05<br>727  1.22<br>1,227  1.30 | T(°C)  $C_p$<br>227  1.11<br>27  1.23<br>1,227  1.37 |
| Density | 2,400 kg/m³ | 4,230 kg/m³ | 3,970 kg/m³ | 3,600 kg/m³ |
| Thermal conductivity (W/m-K) | 1.6 (100°C)<br>1.8 (400°C) | 6.5 (100°C)<br>3.3 (1,200°C) | 27 (100°C)<br>13 (400°C)<br>7.4 (1,800°C) | 12.3 (624°C)<br>10.0 (823°C)<br>8.0 (1,019°C) |
| Thermal stability | b | b | b | b |
| Hardness | 6 (Mohs) | 7 (Mohs) | 9 (Mohs) | 5.5 (Mohs) |

(a): air, (i): inert, NA: not available
b At elevated temperature, it is anticipated that the sinterability of the oxides will be greater than that of the non-oxide materials under consideration and that this will be the primary limitation of oxides.

Fig. 27

PARTICULATE HEAT TRANSFER FLUID AND RELATED SYSTEM AND METHOD

CROSS-REFERENCE TO RELATED APPLICATIONS

This application is a national stage filing under 35 U.S.C. 371 of PCT/US2013/064127 filed Oct. 9, 2013, which International Application was published by the International Bureau in English on Apr. 17, 2014, and application claims priority from U.S. Provisional Application No. 61/712,104, filed on Oct. 10, 2012, which applications are hereby incorporated in their entirety by reference in this application.

FIELD OF THE INVENTION

The present invention is directed to heat transfer media, particularly heat transfer media suitable for use in concentrated solar power systems and solar thermochemical processes.

BACKGROUND

Harnessing solar energy as a substitute for combustion-based energy production continues to generate interest. Concentrated solar power (CSP) systems use reflective panels to direct and concentrate solar energy onto a receiver, where the solar energy heats a heat transfer fluid (HTF) that ultimately conveys heat to a heat engine, typically a steam turbine. Various CSP system designs exist, including parabolic trough, power tower, Fresnel reflectors, concentrated thermoelectric devices, and dish Stirling systems. Other solar energy systems can include solar thermochemical cycles, solar biomass gasification, high temperature catalysis, solid-oxide fuel cells, and solid oxide electrolyzers.

Since solar energy collection is obviously limited by daylight availability and cloud cover, the efficiency and economic viability of CSP systems can be greatly enhanced through use of thermal energy storage (TES). Using TES, the energy conversion system can operate over an extended timeframe, even during periods of extensive cloud cover or at night, or energy production can be shifted to times of greater demand. A variety of TES systems have been developed, including various two-tank systems and single-tank thermocline systems, and these TES technologies offer variations depending on whether the HTF and the thermal storage medium are the same or separate materials.

An important consideration in developing a viable TES system is the type of thermal storage medium that will be utilized. A conventional organic HTF is a eutectic mixture of biphenyl and diphenyl oxide (sold commercially under the THERMINOL tradename). However, THERMINOL fluids have very low thermal conductivity and a relatively low temperature threshold as stable liquids, and are therefore poorly suited as a thermal storage medium. Molten salt mixtures, such as mixtures of sodium nitrate and potassium nitrate (so-called "Solar salt"), have gained more recent attention as thermal storage media. Such mixtures exhibit greater thermal stability and thermal conductivity than THERMINOL materials, and have been successfully used in TES systems, particularly the parabolic trough system of the Andasol solar power station and the power tower system used in the Gemasolar plant, both in Andalusia, Spain. Indeed, the Gemasolar power tower system became the first commercial CSP system to produce an uninterrupted supply of electricity for 24 hours during the summer of 2011. Other materials have also been proposed as thermal storage materials in TES systems, including high-temperature concrete or castable ceramic materials, molten metals, composite nanofluids (e.g. nanoparticles dispersed in a liquid), high pressure gas, molten glass, and phase change materials (PCM).

The thermal storage media proposed to-date suffer from certain drawbacks. For example, the molten salt mixtures presently used in commercial CSP plants exhibit a melting point over 200° C., which means special care must be taken to avoid freezing along the fluid pathway. PCM materials require complex systems, usually involving multiple heat exchangers and multiple PCMs that melt at different temperatures. Concrete or ceramic solid storage structures are limited by the heat transfer rate between the HTF piping and the solid structure. Additionally, concrete structures are limited by the composition and currently also limited to temperatures below 700° C.

Accordingly, there is a continuing need in the art to provide thermal storage media capable of efficiently operating within TES systems adapted for use in CSP plants.

SUMMARY OF THE INVENTION

The invention provides a heat transfer fluid for a heat transfer system that provides enhanced thermal stability as compared to conventional heat transfer fluids, particularly those used in CSP systems. In one aspect of the invention, a heat transfer system is provided that includes at least one storage vessel containing a heat transfer fluid, the heat transfer fluid comprising a plurality of particles of a metal-containing material having a melting point of greater than about 800° C. (e.g., microparticles or nanoparticles), the heat transfer fluid being substantially free of a liquid component; and a heat source configured to transfer heat to the heat transfer fluid. The heat source can vary, and examples include a solar heat source, a nuclear reactor, a cement kiln, or other industrial high temperature heat sources. The heat transfer fluid optionally further includes an inert gas in addition to the particles.

The heat transfer system of the invention can also include a heat engine in fluid communication with the heat transfer fluid and configured to convert heat energy received from the heat transfer fluid directly into electric energy or into mechanical energy, which can then be used to produce electricity. Typically, the heat transfer system will include at least one heat exchanger in fluid communication with the heat transfer fluid and configured to transfer heat from the heat transfer fluid to a second fluid, such as water, steam, carbon dioxide, helium, or air.

In certain embodiments, the heat transfer system can include at least one thermochemical reactor in fluid communication with the heat transfer fluid and configured to transfer heat from the heat transfer fluid to the thermochemical reactor. In certain embodiments, the heat capacity of the particles used in the invention is believed to be sufficient not only for electricity production (which, for example could be used for hydrogen production by electrolysis for the purpose of, e.g., liquid fuel production), but also sufficient to provide heat for a variety of solar thermochemical reactions including, without limitation, thermo-catalytic or steam reforming of natural gas to produce syngas, gasification of biomass to produce syngas, a sulfur-iodine cycle, a zinc-zinc oxide cycle, and an iron oxide (e.g., $FeO/Fe_2O_3$) cycle, water splitting, $CO_2$ reduction, light metals production, and hydrocarbon or fluorocarbon cracking.

In other embodiments, the heat transfer system of the invention includes at least one high temperature fuel cell or at least one electrolyzer in fluid communication with the heat transfer fluid, the heat transfer system configured to transfer heat from the heat transfer fluid to the fuel cell or electrolyzer. Exemplary fuel cells include solid oxide fuel cells, alkaline fuel cells, phosphoric acid fuel cells, and molten salt fuel cells. Exemplary electrolyzers include solid oxide electrolyzers, molten salt electrolyzers, and alkaline electrolyzers.

In certain embodiments, the heat source is a solar heat source. In other words, the heat transfer fluid is used as part of a CSP system, such as a power tower CSP system utilizing a solar heat source in the form of a plurality of heliostats positioned to concentrate solar energy on a receiver, the heat transfer fluid being in fluid communication with the receiver.

The heat transfer systems of the invention can include a thermal energy storage component configured to store the heat transfer fluid as a thermal storage medium such that heat from the heat transfer fluid can be transferred to a heat engine or thermochemical reactor in the absence of heat from the heat source (e.g., in the absence of sufficient sunlight).

In another aspect of the invention, a method for transferring heat is provided, the method including the steps of providing at least one storage vessel containing a heat transfer fluid, the heat transfer fluid comprising a plurality of particles of a metal-containing material having a melting point of greater than about 800° C., the heat transfer fluid being substantially free of a liquid component; conveying the heat transfer fluid in solid particulate form from the storage vessel to a heat source such that heat from the heat source can be transferred to the heat transfer fluid to form a heated fluid, the heated fluid remaining in solid particulate form; conveying the heated fluid to a at least one device selected from the group consisting of a heat engine, a thermochemical reactor, a fuel cell, a thermoelectric generator, and an electrolyzer in fluid communication with the heat transfer fluid such that heat energy received from the heat transfer fluid is converted into one or more of electric energy, mechanical energy, or chemical energy for use in the device; recovering a cooled fluid in solid particulate form from the heat engine or thermochemical reactor; and recycling the cooled fluid for reheating by the heat source. The heat engine can include at least one heat exchanger as noted above.

The particles used in the system and method of the invention can vary, but will typically have a melting point of greater than about 1500° C. Exemplary metals of the metal-containing materials include transition metals, earth metals, metalloids, post-transition metals, and combinations thereof. Specific metal embodiments include silicon, tin, titanium, aluminum, zinc, iron, nickel, manganese, magnesium, calcium, strontium, barium, copper, silver, tungsten, niobium, molybdenum, vanadium, zirconium, tantalum, boron, thorium, uranium, and combinations thereof. The form of the metal-containing material can vary, but is typically selected from borides, carbides, nitrides, oxides, carbonitrides, silicides, sulfides, and combinations thereof.

The invention also provides a heat transfer fluid comprising a plurality of particles of a metal-containing material having a melting point of greater than 800° C. and one or more additives adapted to promote flowability or thermal stability of the heat transfer fluid, the heat transfer fluid being substantially free of a liquid component.

These and other features, aspects, and advantages of the disclosure will be apparent from a reading of the following detailed description together with the accompanying drawings, which are briefly described below.

The invention includes, without limitation, the following embodiments.

Embodiment 1

A heat transfer system comprising:
i) a tubular receiver positioned to receive heat from a heat source, the receiver comprising one or more enclosed tubes configured for gravity-driven flow of a particulate heat transfer fluid (e.g., generally spherical particles) therethrough in a dense, unfluidized state having a particle volume fraction of at least about 25% (e.g., at least about 30%, or at least about 40%, or at least about 50%); and
ii) at least one storage vessel containing at least a portion of the particulate heat transfer fluid, the storage vessel in fluid communication with the tubular receiver and positioned to receive the heat transfer fluid therefrom,
wherein the particulate heat transfer fluid comprises a plurality of particles of a metal-containing material having a melting point of greater than 800° C., the heat transfer fluid being substantially free of a liquid component.

Embodiment 2

The heat transfer system of any preceding or subsequent embodiment, wherein the heat source is a solar heat source, a nuclear reactor, or a cement kiln.

Embodiment 3

The heat transfer system of any preceding or subsequent embodiment, wherein the heat source is a solar heat source comprising a plurality of heliostats positioned to concentrate solar energy on the tubes of the tubular receiver.

Embodiment 4

The heat transfer system of any preceding or subsequent embodiment, wherein the particles have a melting point of greater than 1500° C.

Embodiment 5

The heat transfer system of any preceding or subsequent embodiment, wherein the metal of the metal-containing material is selected from the group consisting of a transition metal, an earth metal, a metalloid, a post-transition metal, and combinations thereof.

Embodiment 6

The heat transfer system of any preceding or subsequent embodiment, wherein the metal of the metal-containing material is selected from the group consisting of silicon, tin, titanium, aluminum, zinc, iron, nickel, manganese, magnesium, calcium, strontium, barium, copper, silver, tungsten, niobium, molybdenum, vanadium, zirconium, tantalum, boron, thorium, uranium, and combinations thereof.

Embodiment 7

The heat transfer system of any preceding or subsequent embodiment, wherein the metal-containing material is in a form selected from the group consisting of borides, carbides, nitrides, oxides, carbonitrides, silicides, sulfides, and combinations thereof.

Embodiment 8

The heat transfer system of any preceding or subsequent embodiment, wherein the particles are bauxite, aluminum oxide, or yttria-stabilized zirconia.

Embodiment 9

The heat transfer system of any preceding or subsequent embodiment, wherein the particles are microparticles having an average primary particle size of about 100 μm to about 500 μm.

Embodiment 10

The heat transfer system of any preceding or subsequent embodiment, wherein the particles are characterized by one or more of the following:
(a) time through Hall flow meter of less than about 65 seconds for 50 grams;
(b) time through Carney flow meter of less than about 12 seconds for 50 grams;
(c) angle of repose ($\alpha$) of about 40 degrees or less (e.g., about 38 degrees or less, about 36 degrees or less, or about 35 degrees or less); and
(d) diameter ratio of greater than about 0.90 (e.g., greater than about 0.91 or greater than about 0.92 or greater than about 0.93).

Embodiment 11

The heat transfer system of any preceding or subsequent embodiment, wherein the one or more tubes comprise a helical or slanted portion.

Embodiment 12

The heat transfer system of any preceding or subsequent embodiment, wherein the tubular receiver comprises a feed manifold positioned to receive the particulate heat transfer fluid and distribute the particulate heat transfer fluid to the tubes, and a collection manifold positioned to receive the particulate heat transfer fluid exiting the tubes.

Embodiment 13

The heat transfer system of any preceding or subsequent embodiment, wherein the one or more tubes comprise a plurality of tubes positioned to receive particulate heat transfer fluid from a series of apertures spaced around the periphery of the feed manifold, and wherein the feed manifold further comprises a convex structure centrally located within the feed manifold to urge flow of the particulate heat transfer fluid toward the series of apertures.

Embodiment 14

The heat transfer system of any preceding or subsequent embodiment, further comprising a valve positioned downstream from the tubular receiver configured to control the mass flow rate of the particulate heat transfer fluid through the tubular receiver.

Embodiment 15

The heat transfer system of any preceding or subsequent embodiment, wherein the valve comprises a venturi-type orifice plate.

Embodiment 16

The heat transfer system of any preceding or subsequent embodiment, wherein the particulate heat transfer fluid further comprises an inert gas.

Embodiment 17

The heat transfer system of any preceding or subsequent embodiment, further comprising a heat engine in fluid communication with the particulate heat transfer fluid and configured to convert heat energy received from the particulate heat transfer fluid into one or more of mechanical energy and electric energy.

Embodiment 18

The heat transfer system of any preceding or subsequent embodiment, wherein the heat engine comprises a steam turbine or a thermoelectric generator.

Embodiment 19

The heat transfer system of any preceding or subsequent embodiment, further comprising at least one heat exchanger in fluid communication with the particulate heat transfer fluid and configured to transfer heat from the particulate heat transfer fluid to a second fluid.

Embodiment 20

The heat transfer system of any preceding or subsequent embodiment, wherein the second fluid is selected from the group consisting of water, steam, helium, carbon dioxide, and air.

Embodiment 21

The heat transfer system of any preceding or subsequent embodiment, wherein the heat exchanger is a gas-solid heat exchanger configured to transfer heat from the particulate heat transfer fluid to a pressurized gas, the heat transfer system further comprising:
a feed lock hopper positioned to receive the particulate heat transfer fluid in a heated state and at atmospheric pressure;
a working lock hopper positioned to receive the particulate heat transfer fluid from the feed lock hopper and pressurize the particulate heat transfer fluid for entry into the gas-solid heat exchanger; and
a bottom lock hopper positioned to receive the heat transfer fluid from the gas-solid heat exchanger and depressurize the particulate heat transfer fluid.

Embodiment 22

The heat transfer system of any preceding or subsequent embodiment, further comprising at least one thermochemical reactor in fluid communication with the particulate heat transfer fluid and configured to transfer heat from the particulate heat transfer fluid to the thermochemical reactor.

Embodiment 23

The heat transfer system of any preceding or subsequent embodiment, wherein the thermochemical reactor is configured to perform a chemical reaction selected from the group consisting of solar thermochemical reforming of natural gas to produce syngas, gasification of biomass to produce syngas, a sulfur-iodine cycle, a zinc-zinc oxide cycle, an iron oxide cycle, water splitting, $CO_2$ reduction, light metals production, and hydrocarbon or fluorocarbon cracking.

Embodiment 24

The heat transfer system of any preceding or subsequent embodiment, further comprising at least one high temperature fuel cell in fluid communication with the particulate heat transfer fluid, the heat transfer system configured to transfer heat from the particulate heat transfer fluid to the fuel cell.

Embodiment 25

The heat transfer system of any preceding or subsequent embodiment, wherein the fuel cell is a solid oxide fuel cell, an alkaline fuel cell, a phosphoric acid fuel cell, or a molten salt fuel cell.

Embodiment 26

The heat transfer system of any preceding or subsequent embodiment, further comprising at least one electrolyzer in fluid communication with the particulate heat transfer fluid, the heat transfer system configured to transfer heat from the particulate heat transfer fluid to the electrolyzer.

Embodiment 27

The heat transfer system of any preceding or subsequent embodiment, wherein the electrolyzer is a solid oxide electrolyzer, a molten salt electrolyzer, or an alkaline electrolyzer.

Embodiment 28

The heat transfer system of any preceding or subsequent embodiment, wherein the heat transfer system is a concentrated solar power system, wherein the tubular receiver is a solar receiver positioned to receive heat from a plurality of heliostats positioned to concentrate solar energy on the receiver, and further comprising at least one device selected from the group consisting of a heat engine, a thermochemical reactor, a fuel cell, and an electrolyzer in fluid communication with the particulate heat transfer fluid such that heat energy received from the particulate heat transfer fluid is converted into one or more of mechanical energy, electric energy, or chemical energy.

Embodiment 29

The heat transfer system of any preceding or subsequent embodiment, wherein the heat transfer system is configured to store the particulate heat transfer fluid as a thermal storage medium such that heat from the particulate heat transfer fluid can be transferred to the device in the absence of solar energy.

Embodiment 30

A method for transferring heat comprising:
i) providing at least one storage vessel containing a particulate heat transfer fluid, the heat transfer fluid comprising a plurality of particles of a metal-containing material having a melting point of greater than 800° C., the heat transfer fluid being substantially free of a liquid component;
ii) conveying the particulate heat transfer fluid from the storage vessel to an inlet of a tubular receiver positioned to receive heat from a heat source, the tubular receiver comprising one or more enclosed tubes; and
iii) flowing the particulate heat transfer fluid by gravity feed through the enclosed tubes in a dense, unfluidized state, the particulate heat transfer fluid having a particle volume fraction of at least about 25% during said flowing step, the particulate heat transfer fluid absorbing heat from the heat source during said flowing step.

Embodiment 31

The method of any preceding or subsequent embodiment, further comprising:
iv) conveying a heated particulate heat transfer fluid from step iii) to a at least one device selected from the group consisting of a heat engine, a thermochemical reactor, a fuel cell, and an electrolyzer in fluid communication with the heat transfer fluid such that heat energy received from the heat transfer fluid is converted into one or more of mechanical energy, electric energy, and chemical energy; and
v) recovering a cooled particulate heat transfer fluid from the device and recycling the cooled particulate heat transfer fluid for reheating by the heat source (such as by recycling the cooled particulate heat transfer fluid to a storage tank and subsequently conveying the heat transfer fluid back to the tubular receiver).

Embodiment 32

The method of any preceding or subsequent embodiment, wherein the device is a heat engine configured to convert heat energy received from the particulate heat transfer fluid into one or more of mechanical energy and electric energy.

Embodiment 33

The method of any preceding or subsequent embodiment, wherein the heat engine comprises a steam turbine or a thermoelectric generator.

Embodiment 34

The method of any preceding or subsequent embodiment, wherein the device comprises at least one heat exchanger configured to transfer heat from the particulate heat transfer fluid to a second fluid.

Embodiment 35

The method of any preceding or subsequent embodiment, wherein the second fluid is selected from the group consisting of water, steam, helium, carbon dioxide, and air.

Embodiment 36

The method of any preceding or subsequent embodiment, wherein the heat exchanger is a gas-solid heat exchanger configured to transfer heat from the particulate heat transfer fluid to a pressurized gas and the device further comprises a lock hopper system, the method further comprising:
  conveying the heated particulate heat transfer fluid at atmospheric pressure to a feed lock hopper;
  conveying the heated particulate heat transfer fluid from the feed lock hopper to a working lock hopper in fluid communication with the gas-solid heat exchanger;
  pressurizing the heated particulate heat transfer fluid in the working lock hopper;
  conveying the heated and pressurized particulate heat transfer fluid to the gas-solid heat exchanger;
  conveying a cooled particulate heat transfer fluid from the gas-solid heat exchanger to a bottom lock hopper; and
  depressurizing the cooled particulate heat transfer fluid in the bottom lock hopper.

Embodiment 37

The method of any preceding or subsequent embodiment, wherein the device is a thermochemical reactor configured to perform a chemical reaction selected from the group consisting of solar thermochemical reforming of natural gas to produce syngas, gasification of biomass to produce syngas, a sulfur-iodine cycle, a zinc-zinc oxide cycle, an iron oxide cycle, water splitting, $CO_2$ reduction, light metals production, and hydrocarbon or fluorocarbon cracking.

Embodiment 38

The method of any preceding or subsequent embodiment, wherein the device is a fuel cell selected from the group consisting of a solid oxide fuel cell, an alkaline fuel cell, a phosphoric acid fuel cell, and a molten salt fuel cell.

Embodiment 39

The method of any preceding or subsequent embodiment, wherein the device is an electrolyzer selected from the group consisting of a solid oxide electrolyzer, a molten salt electrolyzer, and an alkaline electrolyzer.

Embodiment 40

The method of any preceding or subsequent embodiment, wherein the heat source is a solar heat source, a nuclear reactor, or a cement kiln.

Embodiment 41

The method of any preceding or subsequent embodiment, wherein the heat source is a solar heat source comprising a plurality of heliostats positioned to concentrate solar energy on the tubes of the tubular receiver.

Embodiment 42

The method of any preceding or subsequent embodiment, further comprising storing the heated particulate heat transfer fluid as a thermal storage medium such that heat from the particulate heat transfer fluid can be transferred in the absence of solar energy (e.g., transferred to one or more of the devices described herein).

Embodiment 43

The method of any preceding or subsequent embodiment, wherein the particles have a melting point of greater than 1500° C.

Embodiment 44

The method of any preceding or subsequent embodiment, wherein the metal of the metal-containing material is selected from the group consisting of a transition metal, an earth metal, a metalloid, a post-transition metal, and combinations thereof.

Embodiment 45

The method of any preceding or subsequent embodiment, wherein the metal of the metal-containing material is selected from the group consisting of silicon, tin, titanium, aluminum, zinc, iron, nickel, manganese, magnesium, calcium, strontium, barium, copper, silver, tungsten, niobium, molybdenum, vanadium, zirconium, tantalum, boron, thorium, uranium, and combinations thereof.

Embodiment 46

The method of any preceding or subsequent embodiment, wherein the metal-containing material is in a form selected from the group consisting of borides, carbides, nitrides, oxides, carbonitrides, silicides, sulfides, and combinations thereof.

Embodiment 47

The method of any preceding or subsequent embodiment, wherein the particles are bauxite, aluminum oxide, or yttria-stabilized zirconia.

Embodiment 48

The method of any preceding or subsequent embodiment, wherein the particles comprise microparticles having an average primary particle size of about 100 µm to about 500 µm.

Embodiment 49

The method of any preceding or subsequent embodiment, wherein the particles are characterized by one or more of the following:
  (e) time through Hall flow meter of less than about 65 seconds for 50 grams;
  (f) time through Carney flow meter of less than about 12 seconds for 50 grams;
  (g) angle of repose ($\alpha$) of about 40 degrees or less; and
  (h) diameter ratio of greater than about 0.90.

Embodiment 50

The method of any preceding or subsequent embodiment, wherein the one or more tubes comprise a helical or slanted portion.

Embodiment 51

The method of any preceding or subsequent embodiment, wherein the tubular receiver comprises a feed manifold positioned to receive the particulate heat transfer fluid and distribute the particulate heat transfer fluid to the one or more tubes and a collection manifold positioned to receive the particulate heat transfer fluid exiting the one or more tubes.

Embodiment 52

The method of any preceding or subsequent embodiment, wherein the one or more tubes comprise a plurality of tubes positioned to receive particulate heat transfer fluid from a series of apertures spaced around the periphery of the feed manifold, and wherein the feed manifold further comprises a convex structure centrally located within the feed manifold to urge flow of the particulate heat transfer fluid toward the series of apertures.

Embodiment 53

The method of any preceding or subsequent embodiment, further comprising a valve positioned downstream from the tubular receiver adapted for control of mass flow rate of the particulate heat transfer fluid through the tubular receiver.

Embodiment 54

The method of any preceding or subsequent embodiment, wherein the valve comprises a venturi-type orifice plate.

Embodiment 55

The method of any preceding or subsequent embodiment, wherein the particulate heat transfer fluid further comprises an inert gas.

BRIEF DESCRIPTION OF THE DRAWINGS

Figure 1:
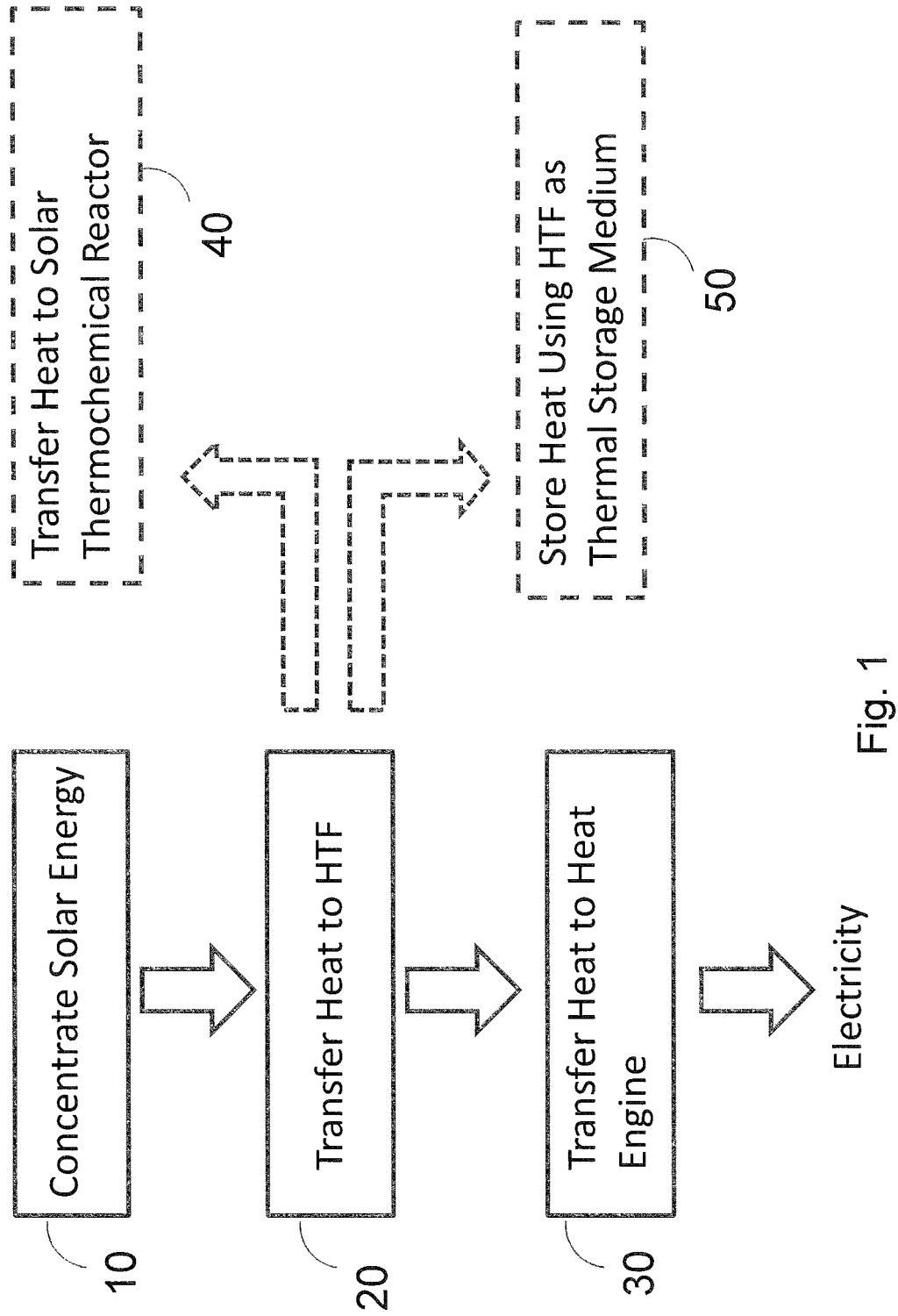
Figure 2:
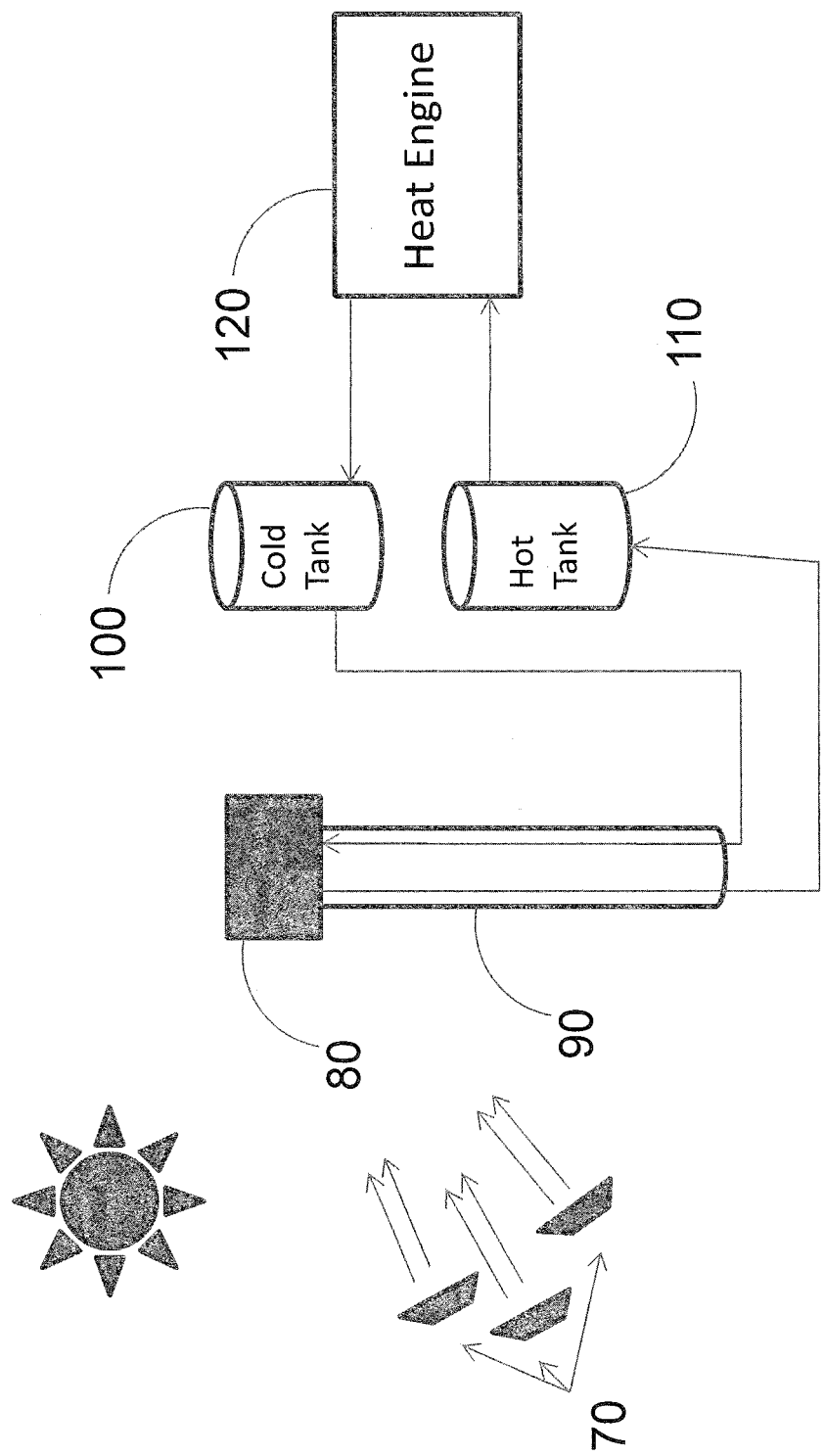
Figure 4:
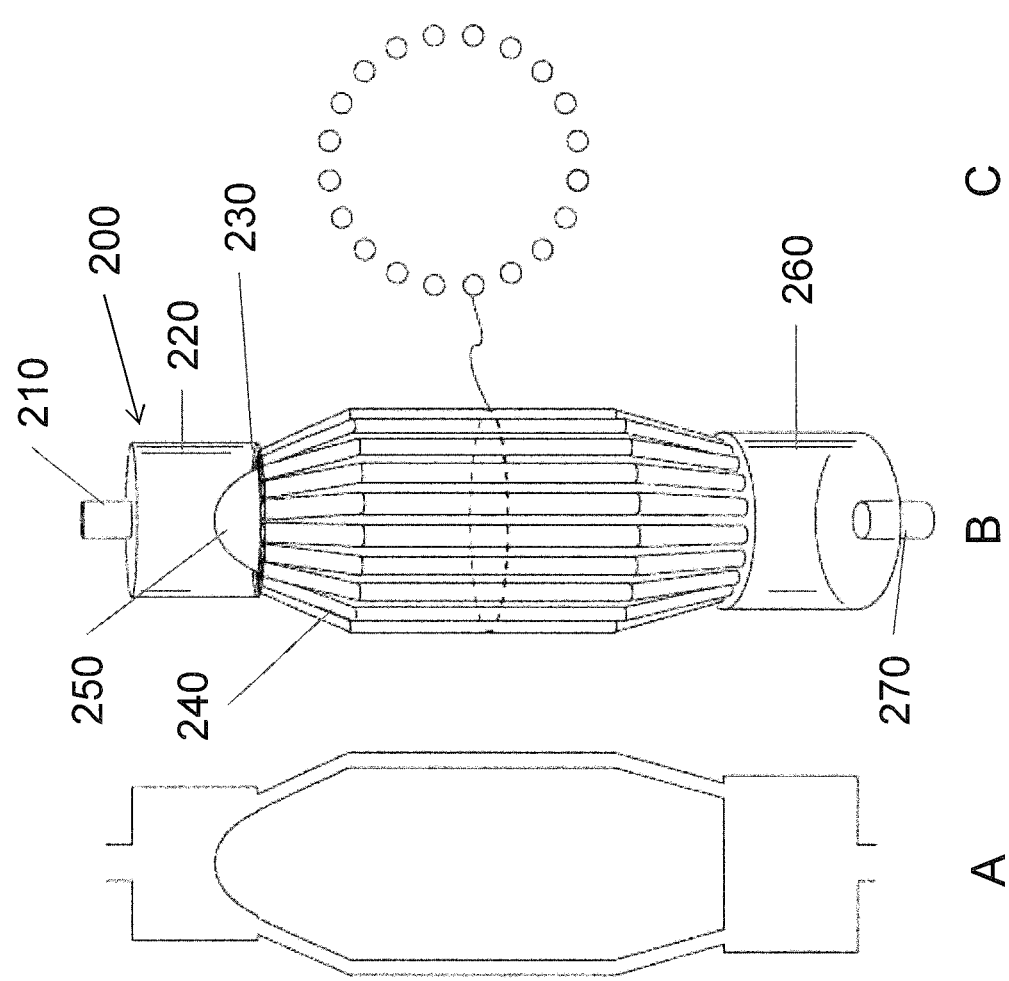
Figure 5:
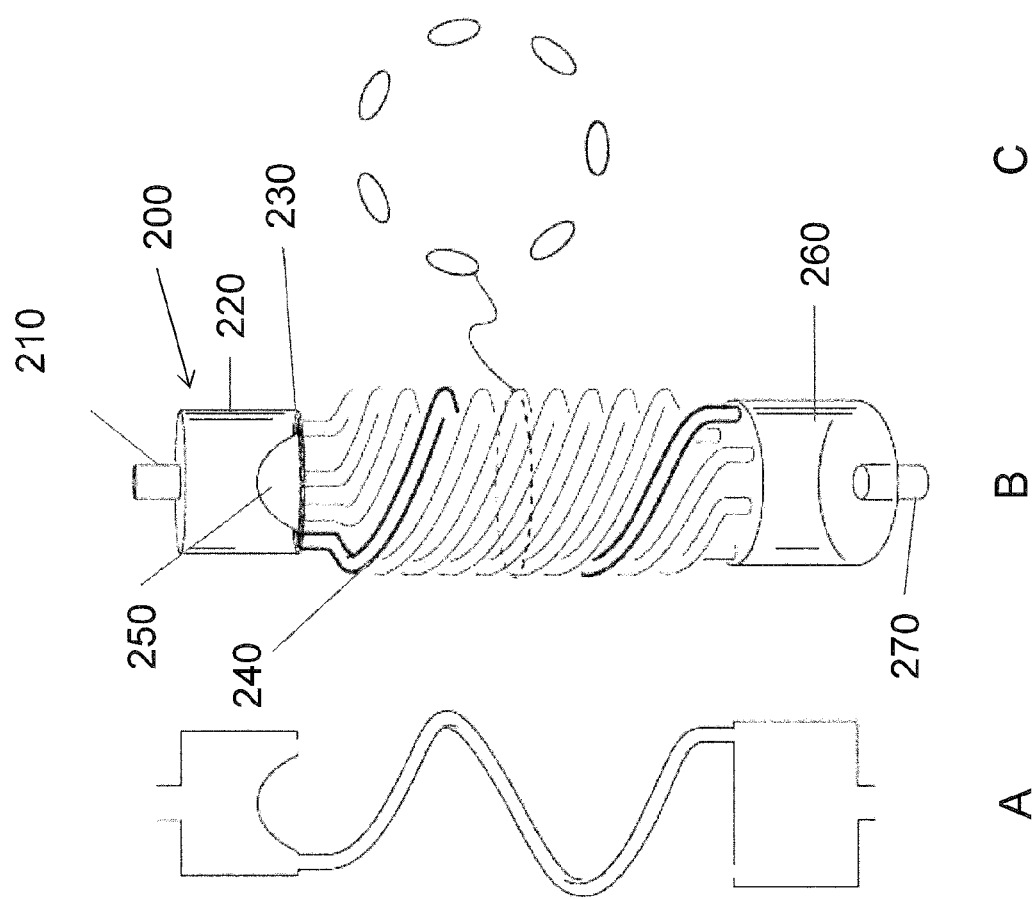
Figure 7:
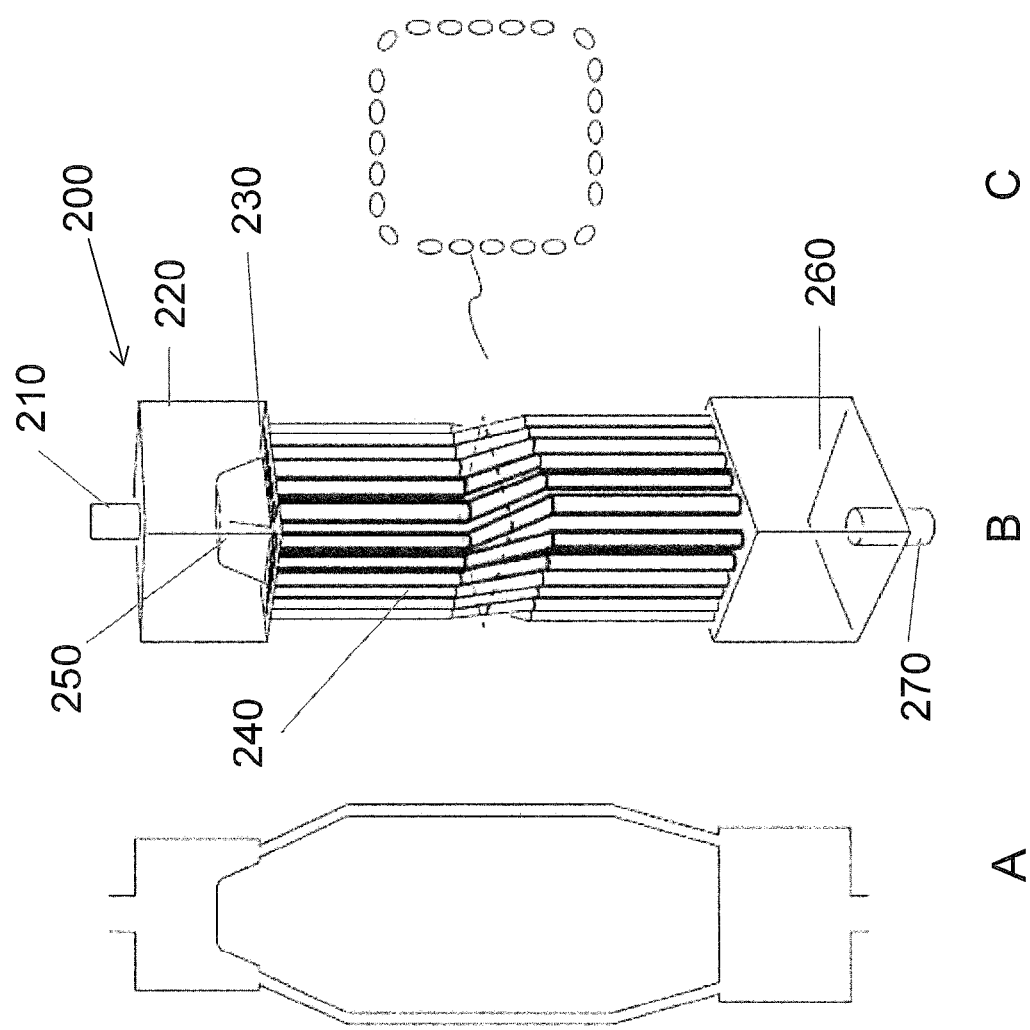
Figure 8:
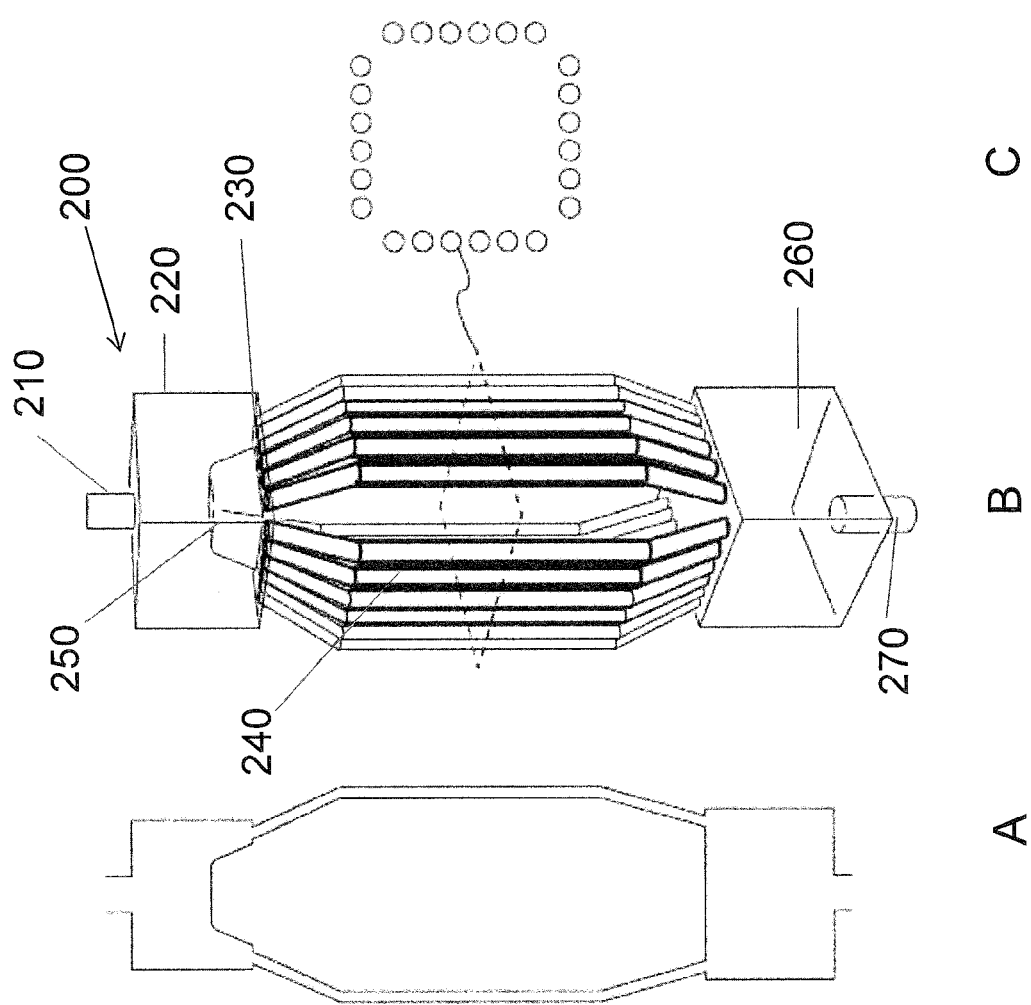
Figure 11:
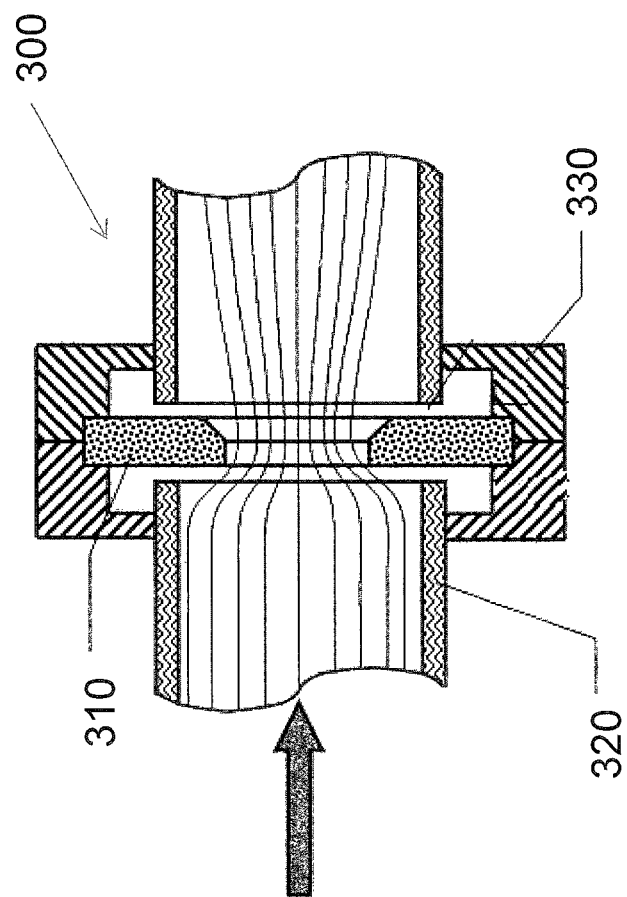
Figure 12:
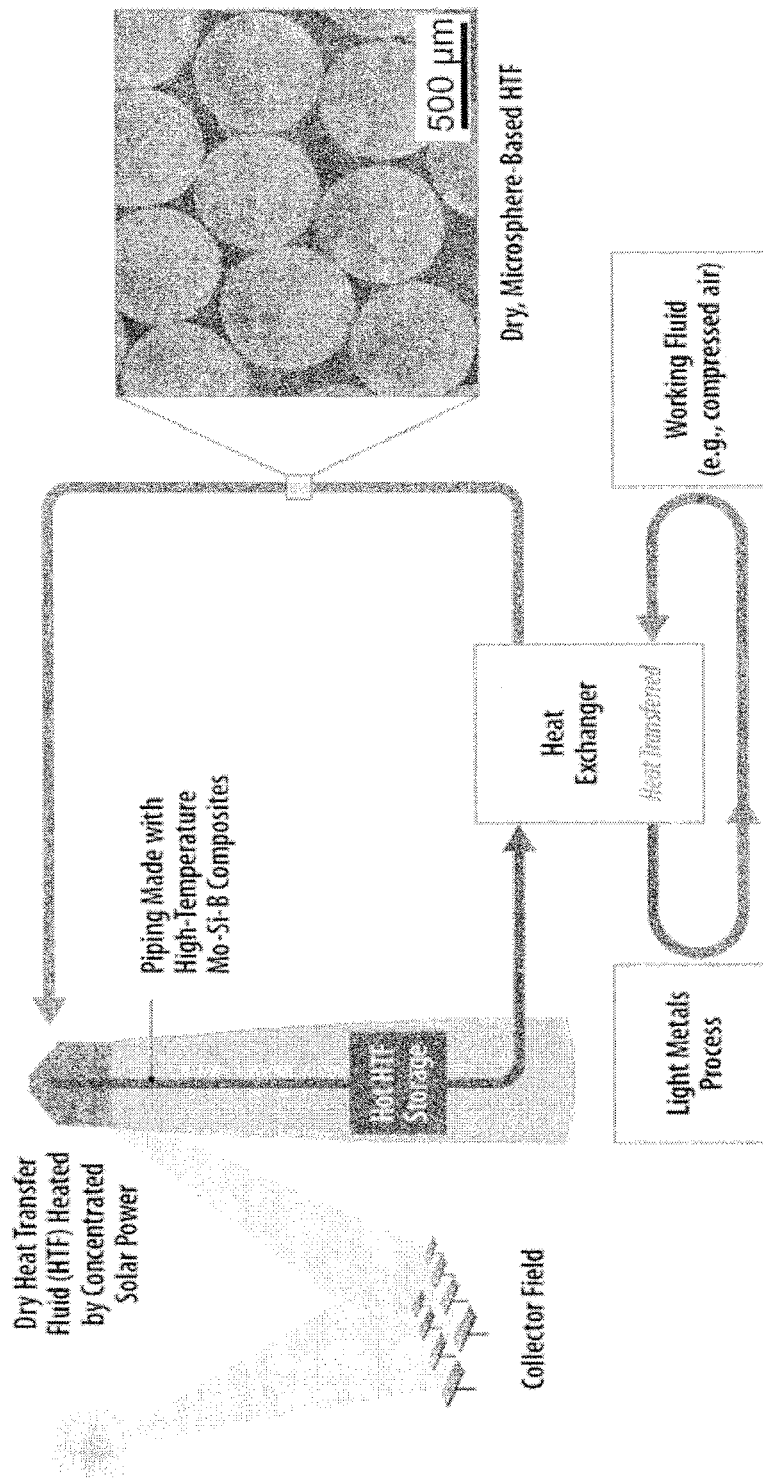
Figure 13:
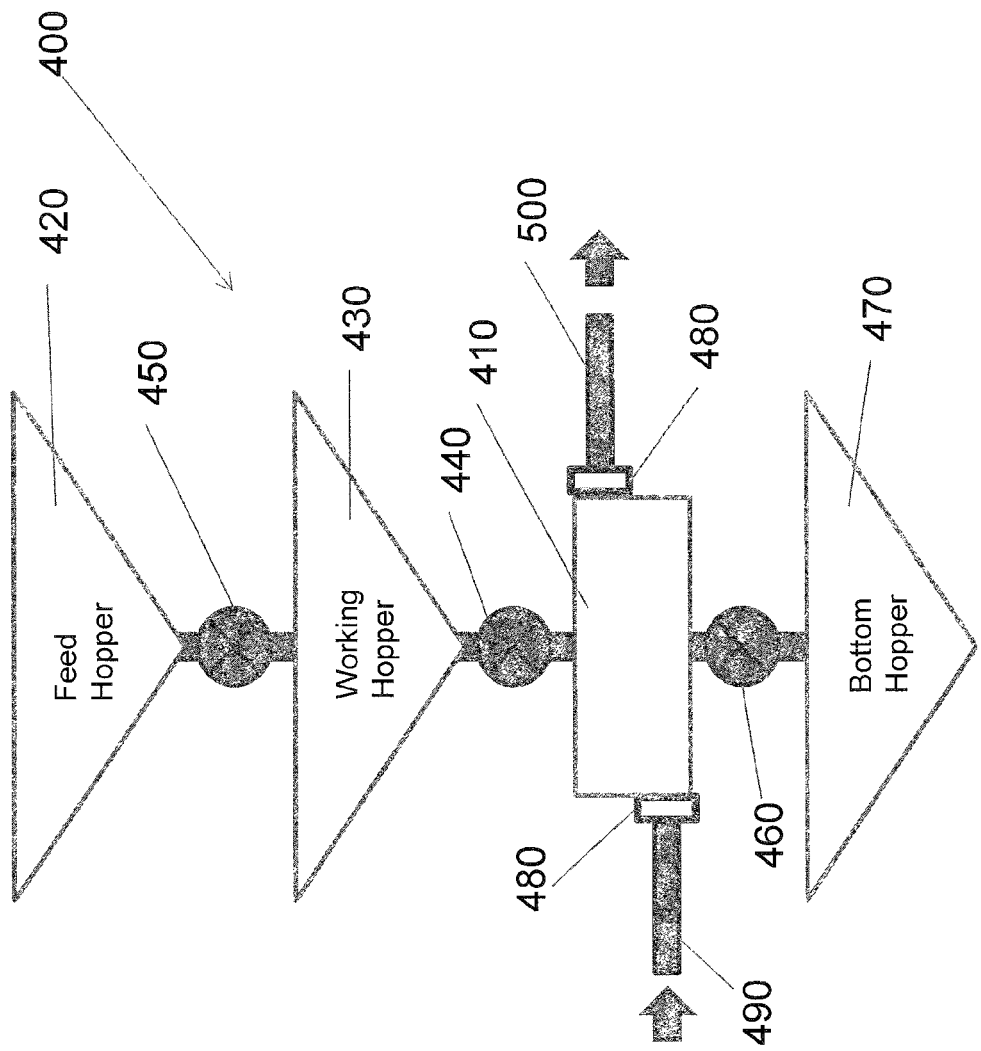
Figure 14:
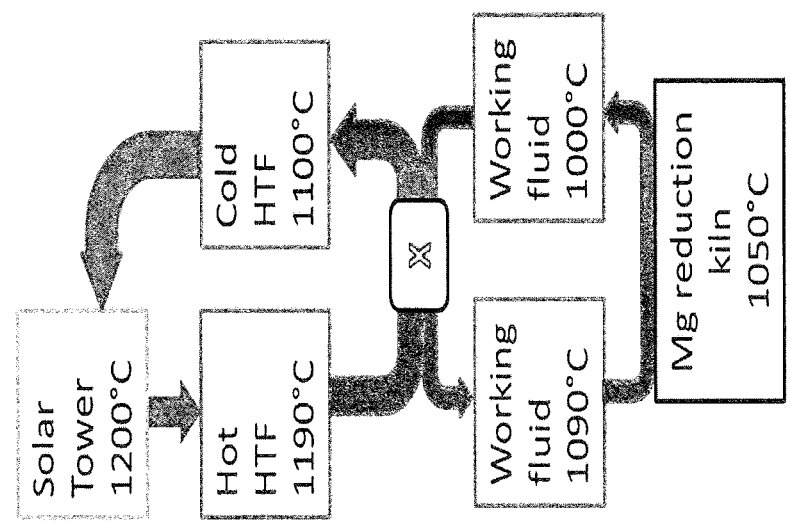
Figure 15:
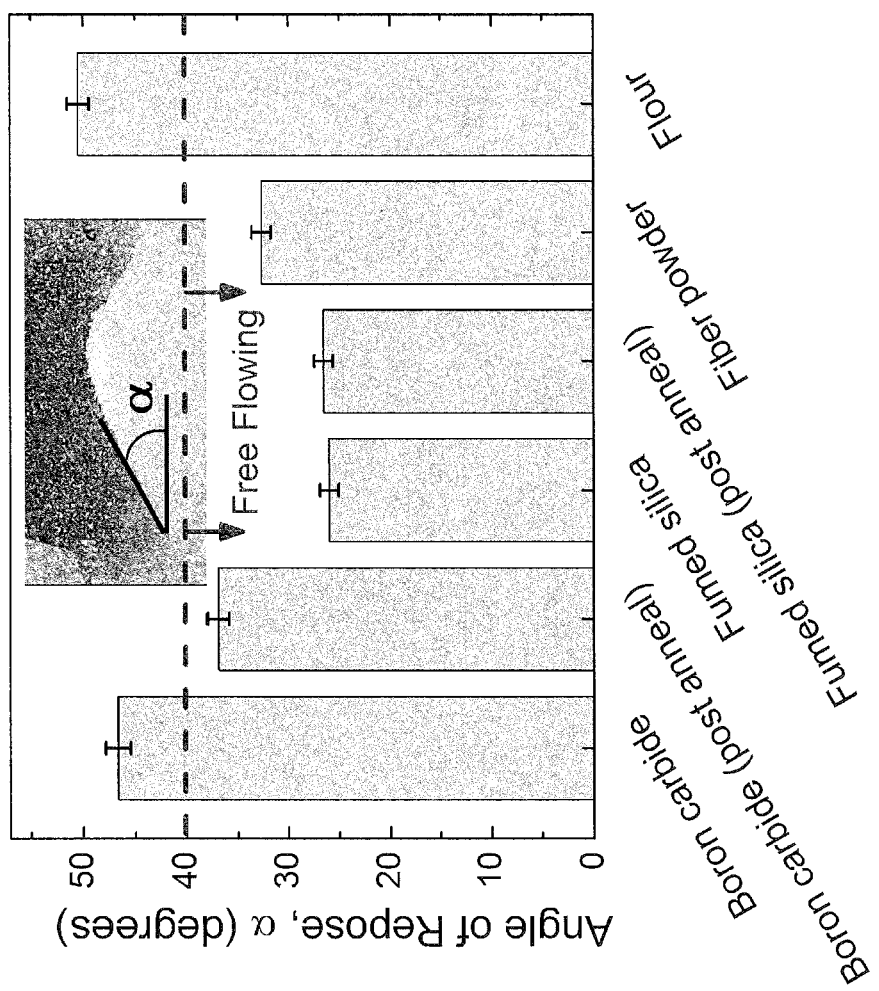
Figure 16:
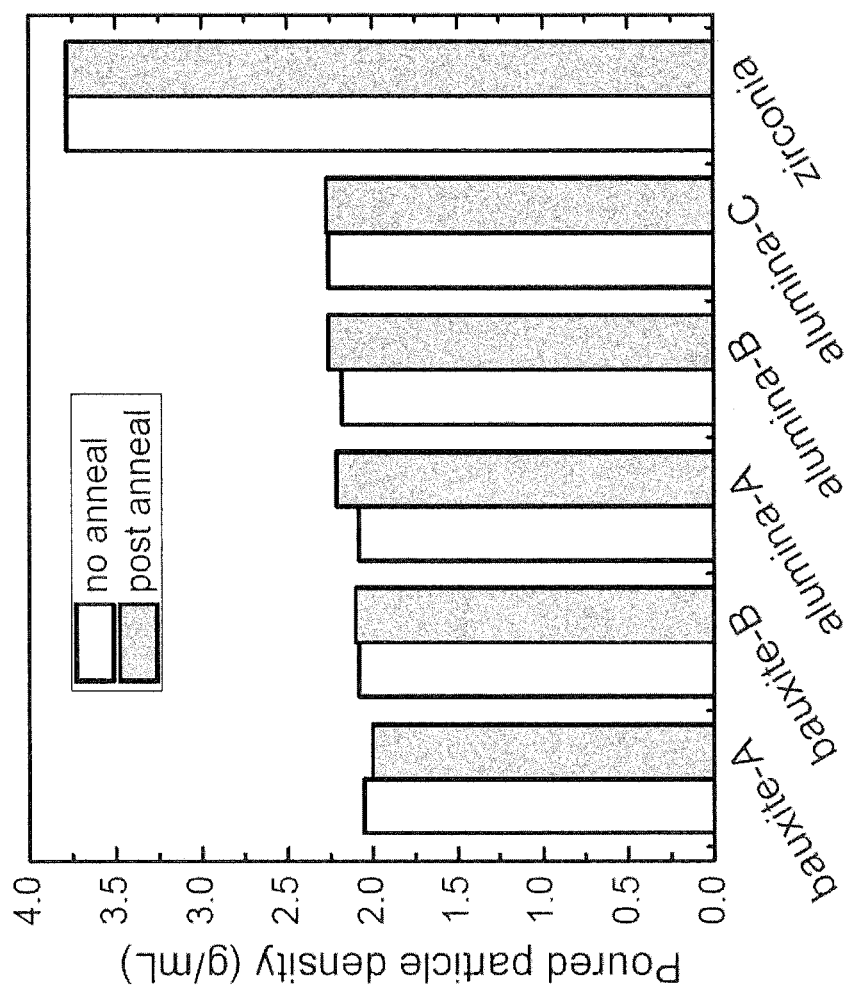
Figure 17:
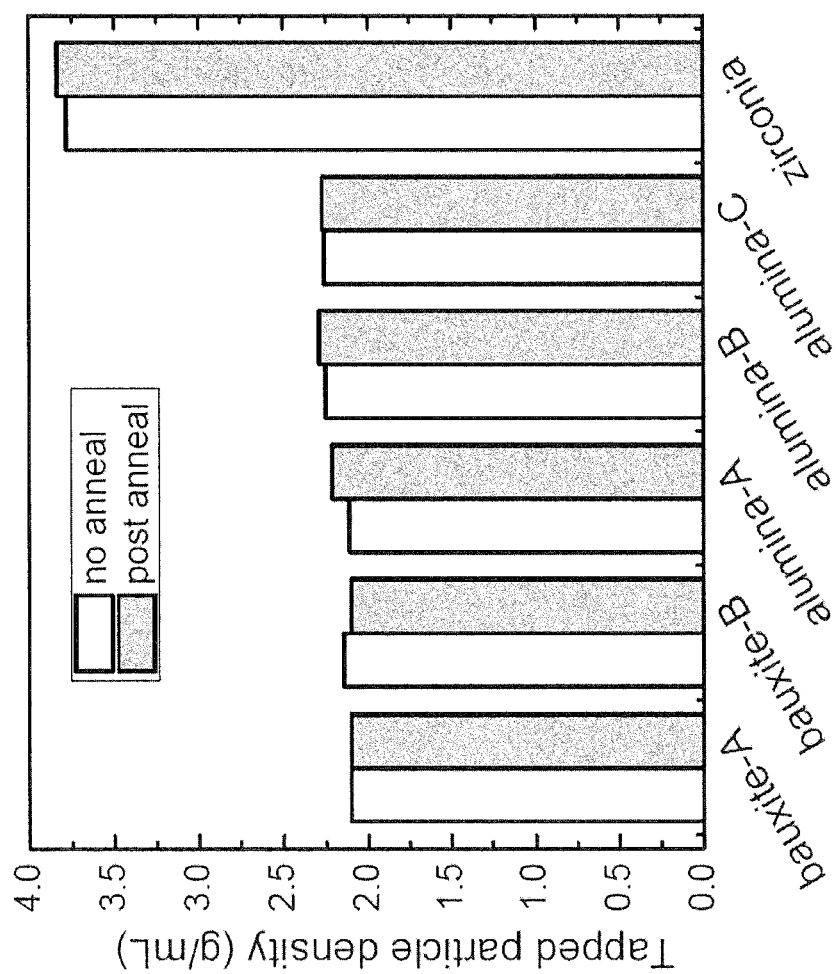
Figure 18:
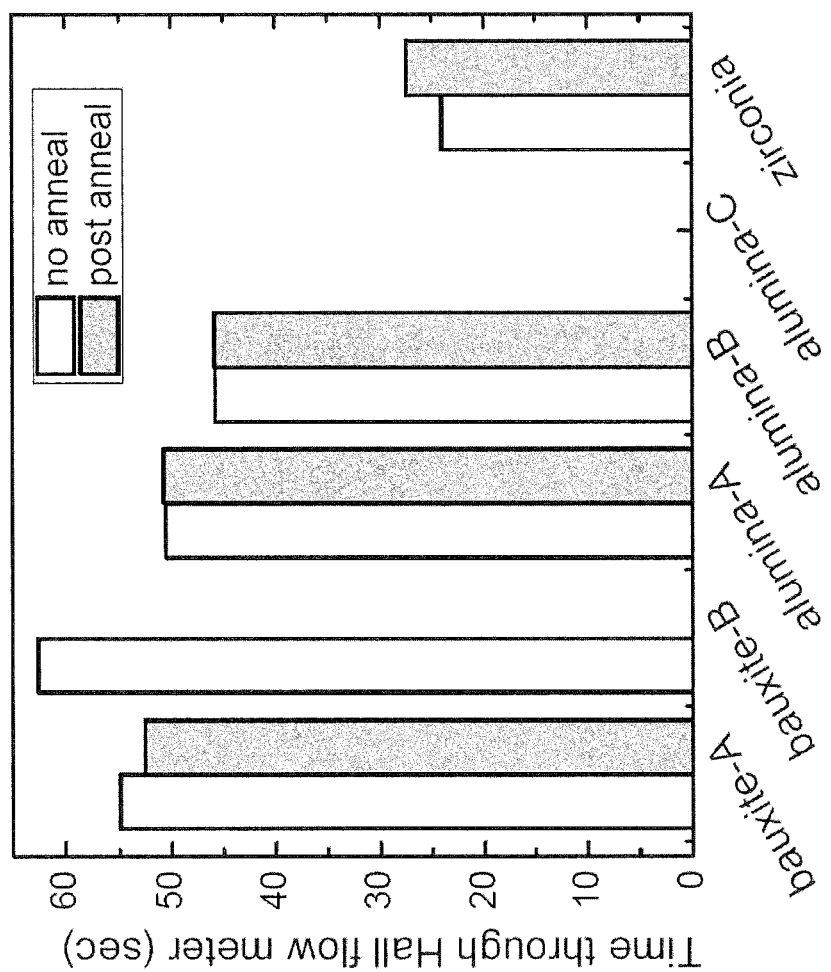
Figure 19:
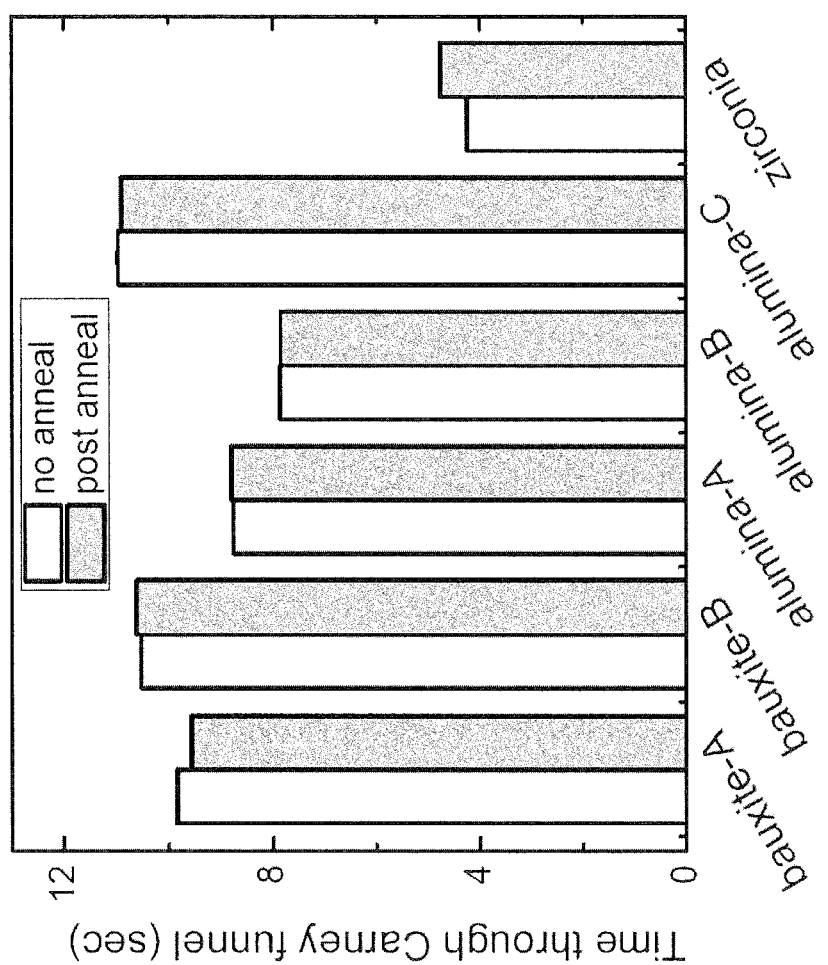
Figure 20:
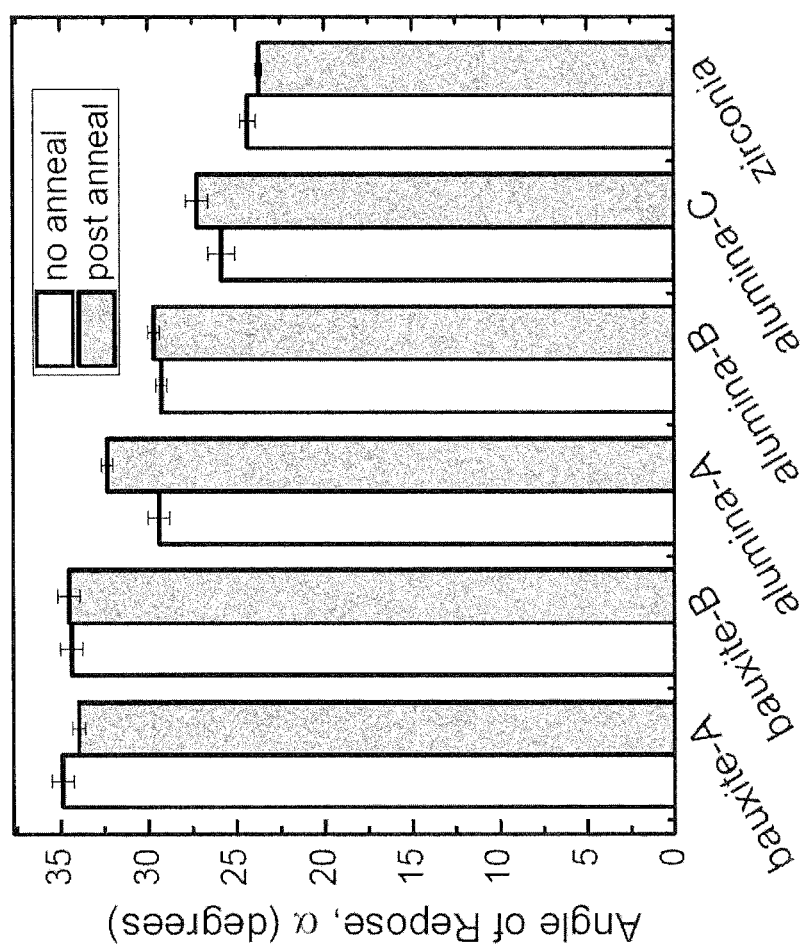

Having thus described the invention in general terms, reference will now be made to the accompanying drawings, which are not necessarily drawn to scale, and wherein:

FIG. 1 is a flow chart illustrating use of the HTF of the invention in a CSP system;

FIG. 2 is a schematic of an exemplary power tower CSP system utilizing the heat transfer fluid of the invention;

FIG. 3 is a schematic of an exemplary solar-driven particle heat transfer and storage system;

FIGS. 4A-4C provide several views of an exemplary solar receiver adapted for use in a circular solar field;

FIGS. 5A-5C provide several views of a further exemplary solar receiver adapted for use in a circular solar field;

FIGS. 6A-6C provide several views of an exemplary solar receiver adapted for use in a south facing solar field;

FIGS. 7A-7C provide several views of a further exemplary solar receiver adapted for use in a circular solar field;

FIGS. 8A-8C provide several views of a further exemplary solar receiver adapted for use in a circular solar field;

FIGS. 9A-9D provide several views of a further exemplary solar receiver adapted for use in a south facing solar field;

FIGS. 10A-10C provide several views of an exemplary solar receiver comprising a single curved slot;

FIG. 11 is a schematic of an exemplary venturi-type orifice for controlling flow and residence time in the solar receiver;

FIG. 12 a schematic of an exemplary solar-driven particle heat transfer and storage system integrated with a light metals process;

FIG. 13 is a schematic of an exemplary lock-hopper system adapted for use to directly transfer heat from the HTF material to a secondary HTF;

FIG. 14 provides a schematic of exemplary temperatures of various streams in an exemplary solar-driven particle heat transfer and storage system integrated with a light metals process;

FIG. 15 graphically illustrates the mean angle of repose ($\alpha$), an indication of the flowability of a powder, for exemplary HTF materials of the invention;

FIG. 16 graphically illustrates the poured particle densities for bauxite, alumina, and zirconia, before and after annealing at 1000° C. in air for 14 hours;

FIG. 17 graphically illustrates the tapped particle densities for bauxite, alumina, and zirconia, before and after annealing at 1000° C. in air for 14 hours;

FIG. 18 graphically illustrates the flow times for bauxite, alumina, and zirconia, through a Hall funnel before and after annealing at 1000° C. in air for 14 hours;

FIG. 19 graphically illustrates the flow times for bauxite, alumina, and zirconia, through a Carney funnel before and after annealing at 1000° C. in air for 14 hours;

FIG. 20 graphically illustrates the mean angle of repose ($\alpha$) for bauxite, alumina, and zirconia, before and after annealing at 1000° C. in air for 14 hours.

Figure 21:
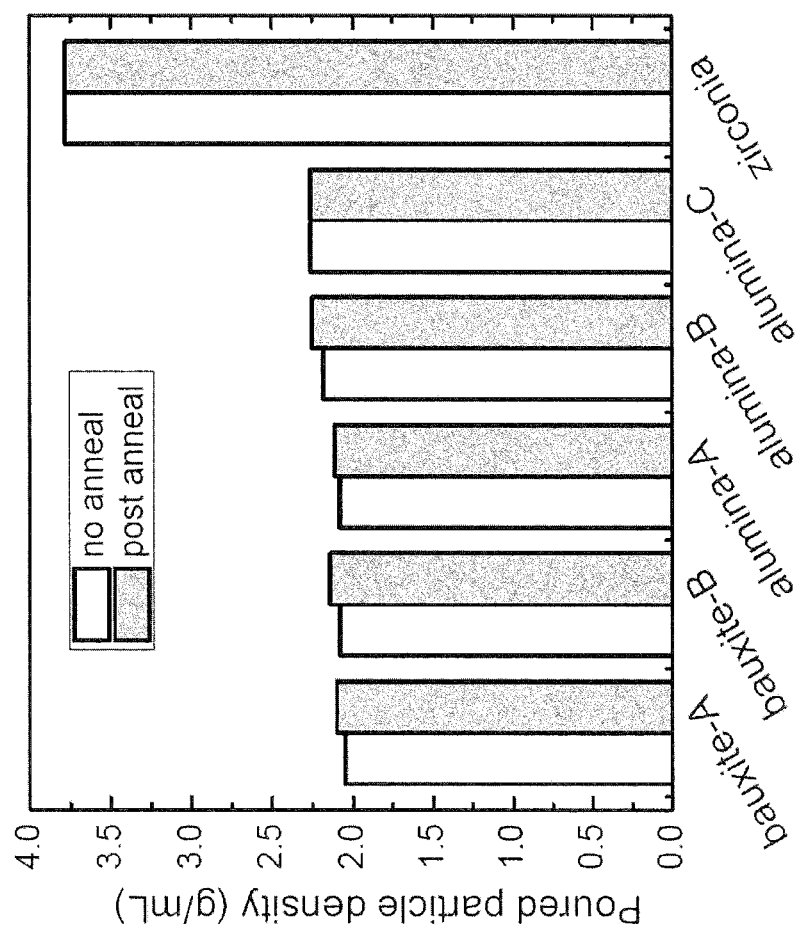
Figure 22:
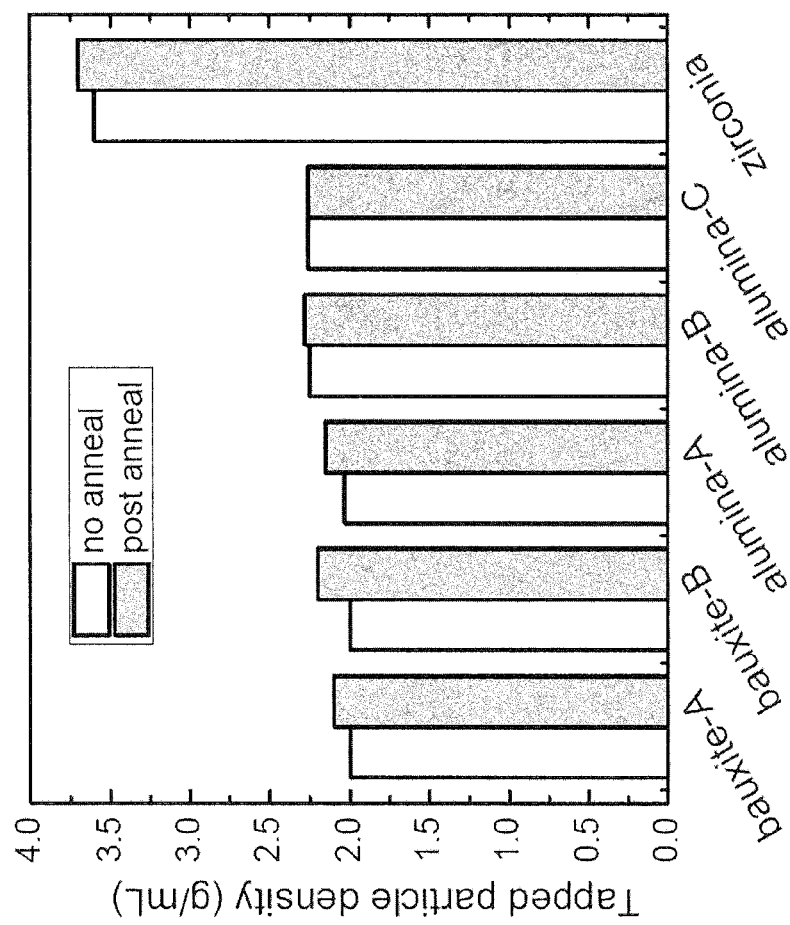
Figure 23:
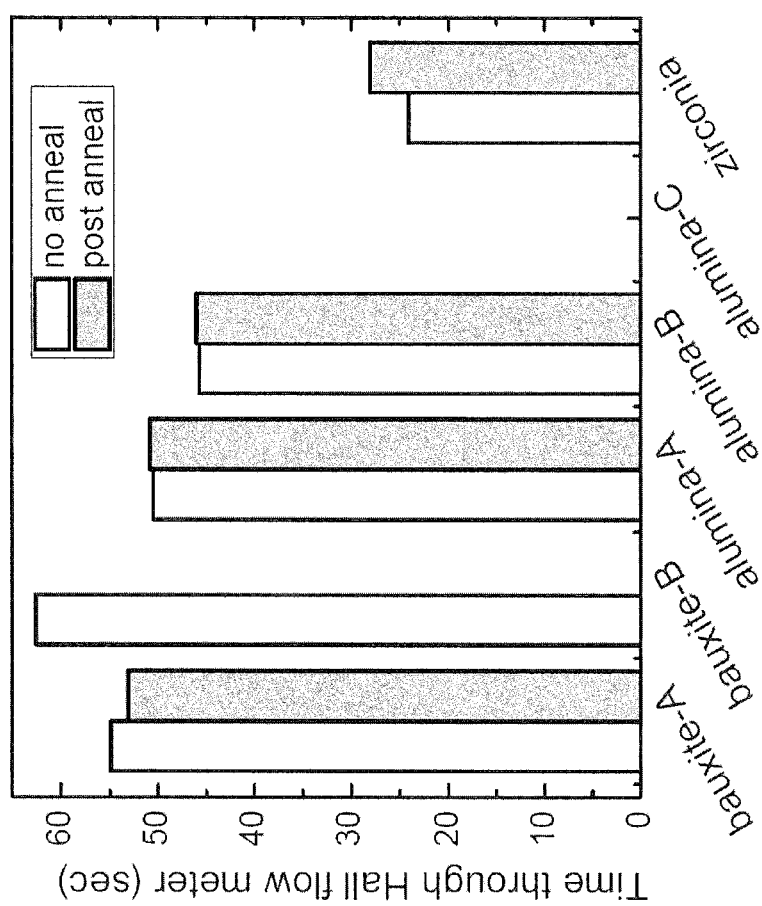
Figure 24:
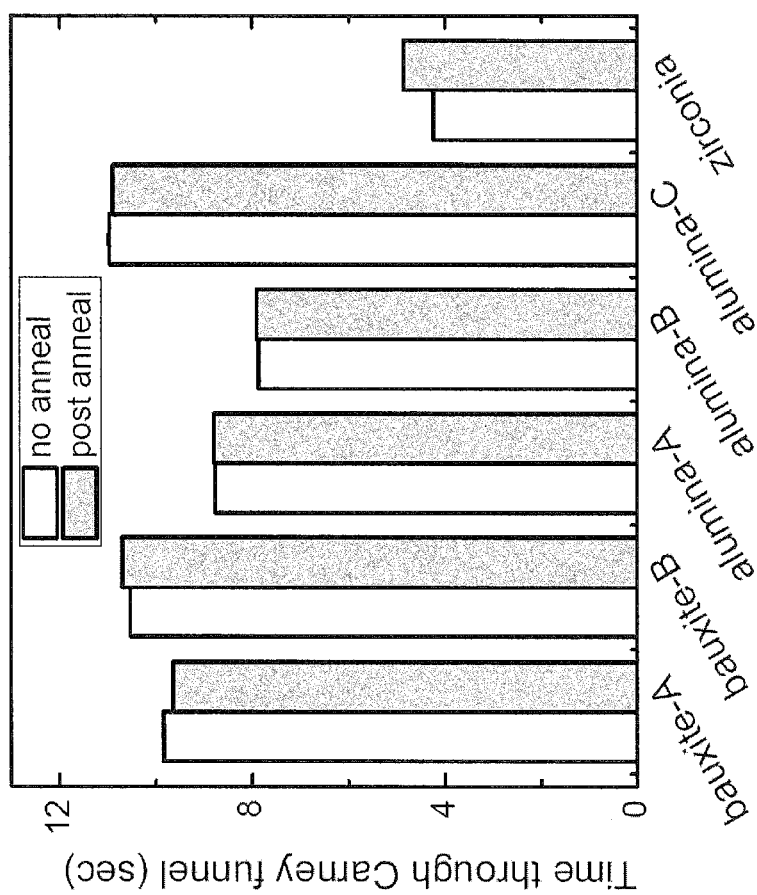
Figure 25:
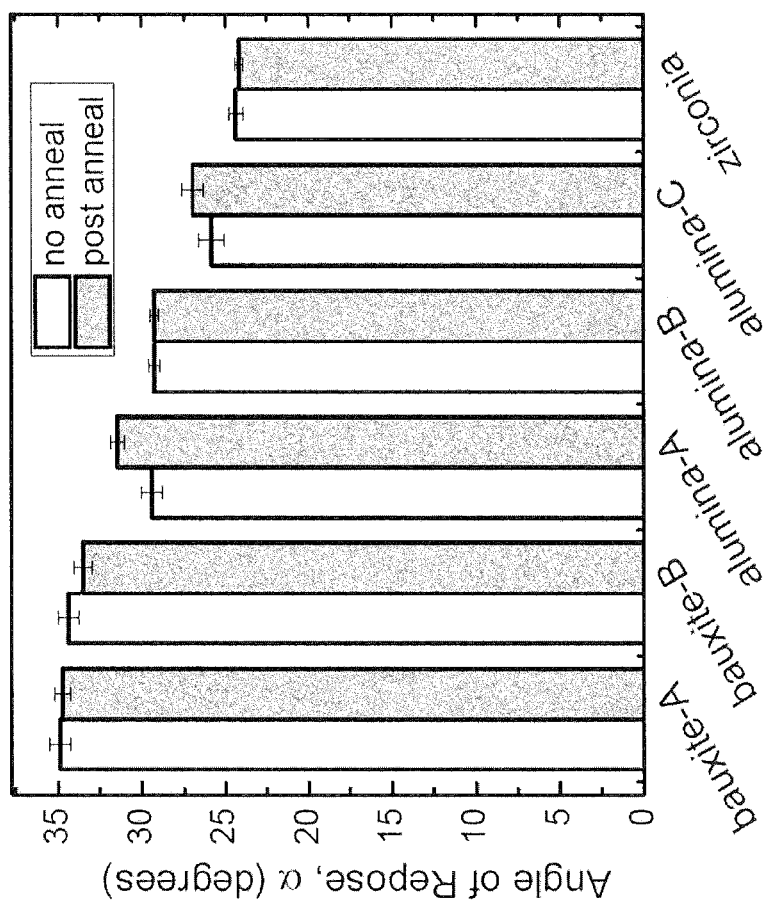

FIG. 21 graphically illustrates the poured particle densities for bauxite, alumina, and zirconia, before and after annealing at 200° (5-6 hours) and 1000° C. (14 hours) in air for 4 days;

FIG. 22 graphically illustrates the tapped particle densities for bauxite, alumina, and zirconia, before and after annealing at 200° (5-6 hours) and 1000° C. (14 hours) in air for 4 days;

FIG. 23 graphically illustrates the flow times for bauxite, alumina, and zirconia, through a Hall funnel before and after annealing at 200° (5-6 hours) and 1000° C. (14 hours) in air for 4 days;

FIG. 24 graphically illustrates the flow times for bauxite, alumina, and zirconia, through a Carney funnel before and after annealing at 200° (5-6 hours) and 1000° C. (14 hours) in air for 4 days;

FIG. 25 graphically illustrates the mean angle of repose ($\alpha$) for bauxite, alumina, and zirconia, before and after annealing at 200° (5-6 hours) and 1000° C. (14 hours) in air for 4 days;

FIG. 26 provides bulk properties in tabular form for various non-oxide particle materials; and FIG. 27 provides bulk properties in tabular form for various oxide particle materials.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

I. Particulate Heat Transfer Fluid

The present invention provides a free-flowing heat transfer fluid suitable for use in CSP systems as both an HTF that absorbs solar energy from the solar field and a thermal storage medium that can store thermal energy for extended periods. The heat transfer fluid of the invention comprises particles of a metal-containing inorganic material. In many cases, the metal-containing materials utilized in the present invention have melting points greater than about 800° C., greater than about 1000° C., greater than about 1500° C., or even greater than 2000° C. Accordingly, the metal-containing materials offer extraordinary temperature stability in solid form. It is believed that the metal-containing particles of the invention will greatly enhance the efficiency of CSP systems as such particles are expected to exhibit much higher thermal conductivity and thermal stability at temperatures far exceeding known HTF materials such as THERMINOL oils or solar salt compositions.

Whereas conventional HTFs must remain below about 650° C., in certain embodiments, the heat transfer particles of the invention can be heated to temperatures exceeding about 800° C. (e.g., exceeding about 1000° C., exceeding about 1200° C., or exceeding about 1500° C.). The maximum temperature will depend, in part, on the gaseous environment to which the HTF is exposed. Use of certain inert gaseous environments (e.g., noble gases such as helium or neon) is expected to improve heat transfer and collection, in part due to their higher thermal conductivity as compared to air. In certain embodiments, the invention provides an HTF that combines the best qualities of a liquid (e.g., flowability, good advective properties) with the best qualities of a solid (e.g., good conductivity, low vapor pressure, no dissociation). The HTF can be used in heat transfer applications where the HTF is used for either heating (e.g., electric power generation) or cooling (e.g., nuclear plant coolant).

The metal of the metal-containing material is typically a transition metal (i.e., a metal found in groups 3 to 12 of the Periodic Table of Elements), an earth metal (i.e., elements of group 13 of the Periodic Table of Elements), a metalloid (e.g., silicon, germanium, arsenic, antimony, and tellurium), a post-transition metal not otherwise included in the above categories (e.g., tin, lead, and bismuth), or a combination thereof. In certain non-limiting embodiments, the metal is silicon, tin, titanium, aluminum, zinc, iron, nickel, manganese, magnesium, calcium, strontium, barium, copper, silver, tungsten, niobium, molybdenum, vanadium, zirconium, tantalum, boron, uranium, thorium, and the like.

The metal-containing material can be used in a base metal form, but is more typically used in a stable compound form such as in the form of borides, carbides, nitrides, oxides, carbonitrides, silicides, sulfides and, combinations thereof. Exemplary metal carbides include boron carbide, tungsten carbide, silicon carbide, titanium carbide, aluminum carbide, iron carbide, zirconium carbide, and combinations thereof. Exemplary metal nitrides include aluminum nitride, boron nitride (cubic or hexagonal), tungsten nitride, silicon nitride, titanium nitride, zirconium nitride, and combinations thereof. Exemplary metal borides include aluminum boride, tungsten boride, silicon boride, titanium diboride, zirconium diboride, and combinations thereof. Exemplary metal silicides include aluminum silicide, tungsten disilicide, boron silicide, titanium disilicide, zirconium disilicide, molybdenum disilicide, and combinations thereof. Where metal oxides are used, the oxide can be in any oxidation state. Exemplary metal oxides include titanium oxide (e.g., TiO or $TiO_2$), silicon oxide (e.g., SiO or $SiO_2$), copper oxide (e.g., CuO or $Cu_2O$), tin oxide, magnesium oxide ($MgO_2$), manganese oxide (e.g., MnO or $Mn_2O_3$), iron oxide (e.g., FeO, $Fe_2O_3$, or $Fe_3O_4$), zirconium oxide, aluminum oxide, vanadium oxide (e.g., VO or $V_2O_3$), molybdenum oxide, cerium oxide, tungsten oxide, zinc oxide, thoria, depleted uranium oxide, and combinations thereof.

In certain embodiments, a high-strength ceramic oxide material is utilized (e.g., a zirconia, alumina, or titania material), which may be unstabilized (i.e., pure) or may include a stabilized material (e.g., a fully or partially stabilized ceramic material). For example, in specific embodiments, the oxide ceramic may be stabilized with an oxide (e.g., yttrium oxide, magnesium oxide, calcium oxide, and/or cerium(III) oxide). In certain specific embodiments, the HTF is yttria-stabilized zirconia (YSZ).

It is noted that the particles of the metal-containing material could be homogenous particles consisting essentially of the same metal material, or have a core-shell structure where the core and shell are made of different metal-containing materials. Alternatively, the particles of the metal-containing material could exhibit a multi-layer structure, such as an ABC trilayer structure, that comprises multiple different metal-containing materials therein. In another embodiment, smaller particles are deposited on the surfaces of larger particles.

In certain embodiments, the particles used in the invention are expected to exhibit dry convective heat transfer coefficients (h values) within a range conducive for use in CSP systems. For example, certain embodiments of the particles of the invention can exhibit h values between about 0.1 to about 30 $kW/m^2$-° C. (e.g., about 10 to about 30 $kW/m^2$-° C.) in air and between about 0.2 to about 80 $kW/m^2$-° C. (e.g., about 20 to about 80 $kW/m^2$-° C.) in helium, depending on Reynolds number.

In certain embodiments of the HTF of the invention, Earth-abundant materials are utilized that are characterized by high bulk heat capacities, thermal conductivities, and melting points, and stability at extreme temperatures and otherwise harsh conditions. In some embodiments, the maximum operating temperatures for these materials is expected to approach their melting temperature (e.g., ≥1,500° C.) under certain inert atmospheric conditions and 1,000° C. in air. The heat capacity range of the HTF material, in certain embodiments, is at least about 1.0 J/g·K, or at least about 2.0 J/g·K, or at least about 3.0 J/g·K, or at least about 4.0 J/g·K. Vapor pressure for the HTF of the invention is negligible (e.g., about 1 atm or less). The viscosity of the HTF material of the invention can vary, but is typically less than about 0.012 Pa·s over the operating temperature range (room temperature up to 1,500° C.). The density of the HTF material of the invention is typically less than about 6000 $kg/m^3$ over the operating temperature range (room temperature up to 1,500° C.). Thermal conductivity of the HTF material is typically greater than about 0.2 W/m·K at 100° C. A comparison of the expected parameters of certain embodiments of the HTF material ("HTF Particles") of the invention with DOE targets (as defined in DE-FOA-0000567, "Multidisciplinary University Research Initiative: High Operating Temperature Fluids") and conventional solar salt is presented in Table 1 below.

TABLE 1

HTF Material Comparison

|  | Solar Salt | DOE 2020 Target | HTF Particles |
|---|---|---|---|
| Max. operating temperature | ~600-650° C. | ≥800° C. | ≥800° C. |
| Melting point | 228° C. | ≤250° C. (for liquid) | ≥1,500° C. |
| Heat capacity | 1.5 J/g · K | ≥1.5 J/g · K | ≥0.8 J/g · K |
| Vapor pressure | ≤1 atm | ≤1 atm | ~0 |
| Density | 1,867 kg/m³ at 600° C. | ≤5,400 kg/m³ at 600° C. | ≤5,400 kg/m³ at 800° C. |
| Thermal conductivity | ≥0.58 W/m · K at 600° C. | ≥0.58 W/m · K at 600° C. | ≥0.3 W/m · K at 800° C. |

An important property of the HTF materials of the invention is the particle volume fraction (PVF), which impacts effective viscosity, thermal conductivity, and specific heat parameters of the material. The desired PVF will depend in part on the composition of the atmosphere surrounding the particles (e.g., air or noble gas), as well as the system used to convey the particles through the solar receiver. To meet certain desired performance targets, the PVF of the HTF material may need to exceed about 25%, or exceed about 30%, or exceed about 40%, or exceed about 50% in air. Such high PVF levels are achievable in advantageous systems of the invention where the particles are gravity-fed through a tubular solar receiver as explained more fully below.

In certain embodiments, replacing air with helium can relax the PVF target due to the higher thermal conductivity of helium. In some embodiments, it may be possible to reduce the PVF to about 10% or greater or about 20% or greater. However, in systems designed to allow the HTF particles to gravity-feed through a tubular solar receiver, as explained more fully below, the PVF will more typically exceed about 30% regardless of the gaseous environment.

Eight non-oxide and four oxide candidate HTF materials according to the invention were subjected to evaluation at three PVF levels (25-50%) and with two cover gases. Bulk properties of the tested particle materials are set forth in the tables of FIG. 24 (non-oxide materials) and FIG. 25 (oxide materials) below. As indicated in FIGS. 24 and 25, h values in the range of 0.1-30 kW/m²-K in air and 0.2-70 kW/m²-K in helium were measured and/or calculated. These values are equal to or greater than h values calculated for conventional HTF materials including solar salt and THERMINOL materials. To give points of reference for the hardness data, diamond's hardness is 80 GPa (10 Mohs) and quartz's hardness is 12 GPa (7 Mohs).

In preferred embodiments, the particles of the invention exhibit free-flowing, liquid-like properties and a tendency to avoid excessive agglomeration that would inhibit the free-flowing, liquid-like properties. The non-agglomerating and liquid-like nature of the particles enables their use without suspension in a liquid. Unlike conventional "nanofluids" that disperse particles in a liquid to obtain flowability, preferred embodiments of the particles of the invention are sufficiently flowable without combination with a liquid component that would be expected to greatly reduce the thermal stability and thermal conductivity of the material. Accordingly, the particles of the material can be used in a form substantially free of a liquid component (e.g., water or another solvent), which preserves the thermal properties of the particles. By substantially free is meant that the particles are used in a form comprising less than about 10 weight percent of liquid, more often less than about 5.0 weight percent or less than about 2.5 or even less than about 1.0 weight percent, based on the total weight of the heat transfer fluid (i.e., the particulate composition). In certain embodiments, the particulate composition will be essentially liquid-free.

Although liquid-free, the HTF particle compositions of the invention can be combined with one or more inert gases. As used in this context, the term inert refers to any gas that does not contribute to any undesirable reactions in the presence of the HTF particle compositions at operating temperature. Selection of a gas that is inert under this definition will depend, in part, on the selection of the HTF particle material, the operating temperature, and the materials of construction used in the system (e.g., the material used to form the tubes of the solar receiver). In some embodiments, air can be viewed as inert. In other embodiments, it may be advisable to use an inert gas with higher thermal conductivity than air, where can help with transport of the HTF material though a pipeline and improve heat transfer and collection. Exemplary inert gases include air, nitrogen, hydrogen, carbon monoxide, carbon dioxide (e.g. in a supercritical state), certain chlorofluorocarbons or hydrofluorocarbons, and noble gases (e.g., helium, neon, and argon). Although some amount of inert gas will necessarily be present (unless the particles are under vacuum) within the interstitial space within the particle mass as it travels through the system, the invention does not require fluidization of the HTF particles at all points through the system. In particular, it is advantageous for the particles to move through the solar receiver in an unfluidized state. Exemplary systems of the invention explained more fully below are capable of utilizing gravity as the primary (or even sole) flow-inducing force acting on the particles as the particles travel through the solar receiver and receive heat energy. Accordingly, in advantageous embodiments, the HTF particles are sufficiently flowable to gravity-feed through an enclosed, tubular solar receiver without fluidization in a gas. Avoidance of fluidization of the particles through the solar receiver can reduce capital costs and parasitic energy losses associated with the use of compressed gas for fluidization.

As used herein, reference to "flowable" or "free flowing" in describing the HTF particles of the invention refers to the ability of the particles to freely flow as a solid through a CSP system, such as described in greater detail below, in order to absorb heat energy in a solar receiver of a CSP system at the operating temperature of the receiver (e.g., about 800° C. or higher). The use of a flowable material that remains solid at all temperatures experienced in the CSP system is advantageous because it avoids the problem of freezing associated with molten salt HTF materials. Accordingly, the particles used as the HTF in the present invention not only provide better thermal storage properties, but also eliminate a handling problem associated with conventional HTF materials.

The flowability of the HTF particles of the invention can be characterized using a number of testing methods, such as Hall flow meter, the Carney funnel, and the angle of repose as detailed in the examples. Exemplary HTF particles of the invention exhibit flowability that can be characterized by one or more of the following:

1) Time through Hall flow meter of less than about 65 seconds for 50 grams;
2) Time through Carney flow meter of less than about 12 seconds for 50 grams;
3) Angle of repose ($\alpha$) of about 40 degrees or less (e.g., about 38 degree or less, about 36 degrees or less, or about 35 degrees or less); and
4) Diameter ratio, defined as the ratio of the minimum and maximum diameter of a single particle, of greater than about 0.90 (e.g., greater than about 0.91, greater than about 0.92, greater than about 0.93, greater than about 0.94, or greater than about 0.95).

The Hall and Carney tests provide a direct measurement of particle flowability through a tube. Measurement of the Angle of Repose indicates the resistance of a particulate material to flow when formed into a conical pile. The diameter ratio of a material is a measurement of how closely a particle approximates a spherical shape. Particles meeting the diameter ratio parameter noted above are also referred to herein as "generally spherical." Descriptions of these testing protocols can be found in the Examples. Use of particles that meet one or more of these flowability parameters allows use of the particles in a tubular solar receiver that relies upon gravity to flow particles through the receiver.

Particularly at higher temperatures, certain metal-containing powders may tend toward excessive agglomeration or inter-particle sintering that could inhibit the desired free-flowing properties. Non-oxide metal-containing materials are believed to be less susceptible to undesirable agglomeration. Additionally, there are methods for reducing the likelihood of undesirable particle agglomeration. For example, use of bimodal mixtures consisting of larger primary particles and smaller void-filling secondary particles will aid in control of PVF of the HTF, which could potentially improve flow behavior. Multiple types of particles having different sizes can be combined using industrial mixers to create a homogenous mixture. In preferred embodiments of the invention, the particles of the invention maintain free-flowing, liquid-like properties at all operating temperatures, and thus, resist agglomeration or sintering that could negatively influence flowability at high temperature.

In some cases, flowability and thermal properties of the HTF at elevated temperatures can be optimized through variations in the HTF formulation. For example, the mechanisms of particle growth and sintering can be controlled by fine-tuning key particle physicochemical characteristics (particle size and distribution, particle volume fraction (PVF), composition, degree of aggregation, morphology) as well as several key formulation parameters. Examples of the latter include the addition of particle-based anti-cohesion agents/surface modifiers/coatings, anti-caking agents, and surface friction modifiers, all of which serve the purpose of maintaining a high degree of HTF flowability over time and under operating conditions at high temperature. Accordingly, any of the above-noted types of flow aids or thermal stability aids could be combined with the particles of the invention. Examples include fumed silica, alumina, titanium dioxide, aluminosilicates, talc, silicates, bentonite, boron nitride, graphite, and borates (e.g., boric acid, sodium borate, potassium borate).

Additionally, in certain embodiments, using particles having a core-shell configuration or doped particles may impede atomic diffusion across grain boundaries to counteract undesirable particle sintering and grain growth. Core-shell particles can be prepared using a variety of physical and chemical vapor deposition methods (e.g., PECVD, ALD, two-stage plasma, etc.), although the coating material should be selected with the appropriate thermal stability for the HTF application. In one embodiment, a plasma reactor can be used to prepare both doped particles and core-shell particles, using techniques such as treatment of plasma/aerosol particles with wet-chemical methods (e.g., sol-gel) or two-stage plasma reactor processes. The particle coating can enhance various properties of the particles, such as reduction in sintering/particle growth or increase in thermal conductivity or heat capacity.

Although the invention is not limited thereto, two exemplary types of HTF particles (a microparticle embodiment and a nanoparticle embodiment) capable of use in the invention are set forth below. Aspects of the above general discussion regarding the HTF particles, such as material of construction, particle function and design, and particle parameters or characteristics, will apply to certain microparticle or nanoparticle embodiments described below.

A. Microparticle HTF

In one embodiment, the HTF of the invention comprises microparticles. As used herein, the terms "microparticles" refer to particles with at least one dimension less than 1000 µm (e.g., about 50 µm to about 1000 µm). Microparticles used in the invention will typically have an average primary particle size of no more than 1000 µm, more often no more than about 500 µm, and in some embodiments, no more than about 300 µm. In certain embodiments, microparticles used in the invention will have an average primary particle size of at least about 50 µm, often at least about about 100 µm, and in some embodiments, at least about 200 µm. Average primary particle size can be determined by visually examining a micrograph of a transmission electron microscopy ("TEM") image or a scanning electron microscopy ("SEM") image, measuring the diameter of the particles in the image, and calculating the average primary particle size of the measured particles based on magnification of the TEM or SEM image. The primary particle size of a particle refers to the smallest diameter sphere that will completely enclose the particle, and this measurement relates to an individual particle as opposed to an agglomeration of two or more particles. The above-noted size ranges are average values for particles having a distribution of sizes. It is also possible to use mixtures of particles having different average particle sizes within the ranges noted herein (e.g., bimodal particle distributions).

The microparticles of the invention can be made by known methods in the art and/or are commercially available. Microparticle useful in the present invention can be made, for example, using processes set forth in U.S. Pat. No. 4,430,279 to Hagio et al. and U.S. Pat. No. 8,283,271 to San-Miguel et al., which are incorporated by reference herein. See, also, Belov et al. "Preparation of Spherical Yttria-Stabilized Zirconia Powders by Reactive-Spray Atomiziation." J Am Ceram Soc. 80:4. 982-990. 1997. Exemplary microparticles available commercially include 30/50 sintered bauxite available from Saint-Gobain, AL9 grinding media spheres available from Norstone Inc., 0.2 mm, 0.5 mm, or 1.0 mm 99.5% alumina balls available from Union Process, and 0.5 mm 95% yttria-stabilized zirconia balls available from Union Process.

B. Nanoparticle HTF

In one embodiment, the HTF of the invention comprises ultrafine particles. As used herein, the terms "ultrafine particles" or "nanoparticles" refer to particles with at least one dimension less than 100 nm. Ultrafine particles used in the invention will typically have an average primary particle size of no more than 100 nm, more often no more than about 50 nm, and in some embodiments, no more than about 20 nm, as determined by visually examining a micrograph of a transmission electron microscopy ("TEM") image or a scanning electron microscopy ("SEM") image, measuring the diameter of the particles in the image, and calculating the average primary particle size of the measured particles based on magnification of the TEM or SEM image. The primary particle size of a particle refers to the smallest diameter sphere that will completely enclose the particle, and this measurement relates to an individual particle as opposed to an agglomeration of two or more particles. The above-noted size ranges are average values for particles having a distribution of sizes. It is also possible to use mixtures of particles having different average particle sizes within the ranges noted herein (e.g., bimodal particle distributions). Still further, it is possible that a combination of nanoparticles and microparticles will be the most suitable candidates for the HTF.

Ultrafine particles of the invention also typically exhibit an average BET specific surface area of at least about 5 $m^2/g$ or at least about 10 $m^2/g$ (e.g., about 10 to about 500 $m^2/g$ or about 80 to about 350 $m^2/g$ or about 200 to about 350 $m^2/g$). As would be understood by one of ordinary skill in the art, BET specific surface area refers to a specific surface area determined by nitrogen adsorption according to the ASTMD 3663-78 standard based on the Brunauer-Emmett-Teller method described in the periodical "The Journal of the American Chemical Society", 60, 309 (1938). The ultrafine particles will often have a calculated equivalent spherical diameter of no more than about 200 nm, such as no more than about 100 nm, and in certain embodiments, about 5 to about 50 nm. As will be understood by those skilled in the art, a calculated equivalent spherical diameter can be determined from the BET specific surface area according to the following equation:

$$\text{Diameter (nm)}=6000/[\text{BET }(m^2/g)\times\rho\ (g/cm^3)].$$

The ultrafine particles of the invention can be made by known methods in the art. Typical production processes involve introducing metal-containing precursors into a plasma chamber, where plasma-generated heat produces a gaseous reaction product. The gaseous product is quenched, typically by impinging the gaseous product with quench streams (e.g., various gaseous streams including hydrogen gas, air, carbon dioxide, and the like) to produce the ultrafine particles. Exemplary metal-containing materials and methods of forming metal-containing materials that could be used in the present invention can be found, for example, in U.S. Pat. Nos. 7,438,880; 7,695,705; 7,635,458; 7,713,349; 7,758,838; and 7,776,303; and in US Pat. Publ. Nos. 2007/0051634; 2007/0254159; 2008/0075649; 2010/0055017; 2010/0233487; and 2011/0223220, all of which are incorporated by reference herein in their entirety. See also U.S. Pat. No. 7,708,974; US Pat. Publ. Nos. 2009/0220698; 2011/0132144; and 2011/0218286; and Bora et al., Free-flowing, transparent γ-alumina nanoparticles synthesized by a supersonic thermal plasma expansion process, Current Applied Physics (2012) 1-5, which are also incorporated by reference herein.

II. CSP System

The present invention provides a CSP system that utilizes the particles described herein as both the HTF and the thermal storage medium. In certain embodiments, the particles utilized in the invention serve as HTF in all phases of the CSP system, including heat transfer, capture, transport, and storage. As shown in FIG. 1, a typical CSP system of the present invention concentrates solar energy at step 10, transfers the heat from the concentrated solar energy to the particles acting as the HTF in step 20, and transfers heat from the HTF to a heat engine in step 30. As noted in FIG. 1, the present invention also allows optional storage (step 50) of the particles as part of a TES system that allows the CSP plant to generate power during periods of darkness.

The heat engine can include any system capable of converting heat energy to mechanical energy using any known thermodynamic cycle, which in turn can be used to produce electricity, and also includes thermoelectric heat engines where heat energy is converted directly into electric energy. Exemplary heat engines typically include transfer of heat from the HTF to steam and use of a steam turbine to produce mechanical energy. It is noted that the present invention can enhance the efficiency of the Rankine cycle used in most CSP systems because of the ability of the particles to reach much higher temperatures as compared to conventional HTF materials. Higher HTF temperatures translate into higher inlet steam temperatures at the steam turbine. It is also noted that the flowable particles of the inventive HTF would work well with a Brayton cycle, which offers several benefits in CSP systems including higher efficiency at smaller scales (e.g., 10 MW plant size) and no water requirement. In a Brayton cycle using the inventive HTF, the HTF heats pressurized air, with or without supplemental heat provide by a combustion chamber (e.g., a gas-fired combustor), which is then injected into a turbine. A solar hybrid gas turbine system that could be modified for use with the particles of the invention was tested by the European Commission and reported in SOLGATE: solar hybrid gas turbine electrical power system (2005). Other exemplary energy conversion systems that could be integrated with the CSP system of the invention include air Brayton combined cycle, supercritical Rankin cycle, supercritical carbon dioxide combined cycle; Photon Enhanced Thermionic Emission (PETE) combined cycle, and the like.

As previously noted, the HTF of the invention can be used as a heat source in a thermoelectric generator, which are heat engine devices that produce electricity based on differences in temperature. A thermoelectric generator typically includes two thermally conductive plates in spaced relation, wherein the two plates are maintained at different temperatures. The HTF of the invention could be used as a heat source for the "hot" plate of the thermoelectric generator. An exemplary thermoelectric generator that could be adapted for use in the present invention is set forth in U.S. Pat. No. 7,638,705, which is incorporated by reference herein.

Although the particle HTF of the invention can be used in any CSP system, the particles are particularly well-suited for use in power tower systems because of the higher temperatures generated at the receiver in such systems. FIG. 2 provides an exemplary schematic of a power tower system with thermal storage that can be used with the particles noted herein. As shown therein, the CSP system includes a plurality of heliostats 70 that direct sunlight to a receiver 80 positioned at the top of a tower 90. The particles are transported from a "cold" tank 100 to the receiver 80, where heat is transferred from the receiver to the particles. The heated particles are then conveyed to an insulated "hot" tank 110, where they can be stored for later use during periods of darkness or used immediately for power generation in a heat engine 120 (which could include, for example, a steam generation system that transfers heat from the HTF to steam and a power generation system in fluid communication with the steam generation system that uses energy from the steam to create electricity). Although FIG. 2 illustrates a two-tank TES system, the invention is not so limited and encompasses use of single-tank thermocline storage systems as well.

The manner in which the particles can be conveyed through the system will vary depending on the rheological properties of the particles. In certain embodiments, pneumatic pump systems conventionally used with flowable powders could be used, such as dense phase powder transport or high density low volume air (HDLV) systems. See, for example, U.S. Pat. No. 7,997,878, which is incorporated by reference herein. In other embodiments, pumps used for highly viscous liquids can be used due to the liquid-like properties of the particles. See, for example, U.S. Pat. Nos. 4,343,602; 4,681,022; 6,152,689; and 6,524,088, which are incorporated by reference herein. Other pumping system options include centrifugal pumps, hydrostatic pressure drop systems, positive displacement pumps, auger type pumps, and the like. In one embodiment, for transport to the top of the receiver 80, the particles can be moved by traditional solids transport methods such as dense phase and dilute phase transport and bucket elevators, or the particles can be fluidized for transport to the top of the tower 90. In an advantageous embodiment, the HTF particles, once fed to the top of the receiver 80, are allowed to gravity feed through a heat exchanger structure within the receiver 80. Although less preferred, the gravity feed though the receiver 80 can be assisted with pressurized inert gas. However, it is not desirable to fluidize the particles as the particles travel through the receiver 80. As understood in the art, fluidization is the operation by which solid particles are transformed into a fluid-like state through suspension in a gas or liquid. Accordingly, while the HTF particles can be transported in a fluidized state in other portions of the CSP system (such as in transport to top of the tower 90), it is advantageous for the HTF particles to avoid moving in a fluidized state through the solar receiver and instead remain in a dense packed form, meaning the particles are preferably not in a suspended state or otherwise gas-assisted in moving through the solar receiver.

As noted above, the HTF particle compositions of the invention typically remain in a relatively dense form throughout the heat transfer system, particularly in the vicinity of the solar receiver, which enhances the efficiency of the heat transfer. Particle volume fraction (PVF) can be estimated using the properties of the particles within a vessel, with geometry applicable to the solar receiver designs (e.g., a straight cylindrical tube). The mass (m) and volume ($v_{tube}$) of an empty copper tube is measured. The mass of the tube filled with particles is also measured. A PVF ratio (which obviously can be converted to a percentage) is calculated using the ratio of the particle mass in the tube to the theoretical mass of a solid material at the same volume as set forth below.

$$PVF = \frac{m_{particle\ in\ v_{tube}}}{(density_{solid}) \times (v_{tube})}$$

Particle volume fraction of the HTF particle compositions of the invention within a heat transfer system, particularly at the location of the solar receiver, typically remains above about 25%, more typically above about 30%, and most often above about 40% or above about 50%. This relatively high PVF within the solar receiver distinguishes the CSP system of the invention from conventional falling particle solar receivers, wherein particles are allowed to free-fall through an open cavity having an aperture for receiving solar radiation. The PVF of the heat transfer media during travel through a receiver in such systems is typically extremely low. For example, the PVF of particles within one design of a falling particle solar receiver has been measured as less than 3% at the top of the receiver, and shown to drop to less than 0.5% as the particles free-fall. See Ho et al., Modeling On-Sun Tests of a Prototype Solid Particle Receiver for Concentrating Solar Power Processes and Storage, Proceedings of the ASME 2009 $3^{rd}$ International Conference of Energy Sustainability (2009) 543-550.

In one particular CSP system embodiment, shown in FIG. 3, the system includes at least one solar receiver 150 where the HTF particles (e.g., with a PVF greater than about 25%) are gravity fed in tubes or a slots (not shown), which are heated externally by concentrated solar energy provided by heliostats 140. The heated flowing particles are stored below the solar receiver in at least one insulated vessel 160. The stored hot particles can then be fed to a heat exchanger 170 where the hot particles can directly or indirectly (i.e., heat is transferred to a wall) transfer heat with a working fluid which is used to drive a turbine 180. The cold particles from the heat exchanger 170 are then recycled back to the top of the solar receiver.

The receiver 150 shown in FIG. 3 can include a tubular structure for conveyance of the HTF particles through the receiver, typically by gravity feed. Reference to "tubular" or "tube" in describing the solar receiver or a portion thereof does not limit the structure to any particular cross-sectional configuration, but only refers to the enclosed nature of the structure, meaning the solar receiver will advantageously wholly enclose or surround the HTF particles during transport through the receiver, such as in a pipe. The cross-section of the tubular solar receiver structure can vary, with exemplary cross-sectional shapes including circles, rectangles, ovals, and arc or semicircular shapes (including shapes having the appearance of a slot or slit). The tubular receiver will contain one or more tubes through which the particles will travel as the particles absorb solar energy, meaning the CSP system is typically designed to concentrate solar energy on the tubes of the central portion of the receiver (denoted by element number 240 in the figures described below). The receiver structure will typically include a feed manifold at one end thereof comprising a defined area for receiving HTF particles to be heated, one or more tubes (of any cross-sectional shape as indicated above) in fluid communication with the feed manifold and positioned to receive HTF particles from the feed manifold such that solar heating of the walls of the tubes results in transfer of heat to the HTF particles as the particles travel therethrough, and a collection manifold in fluid communication with the one or more tubes and positioned to receive heated HTF particles therefrom. In certain embodiments, the receiver will include a plurality of tubes such that the feed manifold serves to distribute the HTF particles to a plurality of different tubes, such as about 5 to about 50 tubes (e.g., about 5 to about 30 tubes).

In certain embodiments, such as those shown in FIGS. 4-10 discussed below, the receiver structure will include one or more tubes 240 arranged around the periphery of the receiver. Although the figures illustrate specific examples of tube cross-sectional shapes, none of the illustrated receiver designs are limited to such cross-sectional shapes. In such embodiments, the feed manifold 200 will typically include an inlet 210 for receiving HTF particles, one or more exterior walls 220 to define the space for the HTF particles within the manifold, one or more apertures 230 spaced around the periphery of a wall surface (e.g., a floor or sidewall) of the feed manifold for providing the fluid communication between the feed manifold and the one or more tubes 240, and a convex structure 250 extending into the feed manifold and positioned centrally within the spaced outlet apertures such that HTF particles are directed along the surface of the convex structure toward the outlet apertures. The convex structure 250 could be, for example, a cone shaped or dome shaped structure having a straight or curved convex surface extending into the feed manifold 200, but there is no precise geometric requirement for the shape of the dome (e.g., the convex structure could be hemispheric or in the shape of a cone or truncated cone or shaped in a manner that merely approximates such shapes). The convex structure 250 will typically be located in a central portion of the feed manifold 200 with the tubes 240 spaced around the periphery of the convex structure. For example, where the tubes 240 are arranged in a generally circular, semicircular, or oval pattern, the convex structure will be located in a radially inward position relative to the tubes. The tubes 240 will empty into a collection manifold 260, which feeds the collected particles into an exit pipe 270.

One of the advantages of the above-described tubular receiver design over certain conventional solar receivers, such as falling particle receivers, is the ability to vary several parameters of the receiver structure in order to achieve a desired residence time for the particles within the receiver and, accordingly, achieve a desired particle temperature exiting the receiver. Such parameters include width and length of the tubes 240, the number and arrangement of tubes, cross-sectional shape of the tubes, the flow path defined by the tubes, and the like. Exemplary tube 240 widths include about 1 to about 6 inches (about 2.5 cm to about 15.2 cm). Exemplary tube 240 lengths (measured from manifold to manifold) range from about 6 to about 50 feet (about 1.8 m to about 15.2 m). Exemplary cross-sectional shapes for the tubes 240 include circular, oval, and rectangular. The tubes 240 can be arranged, for example, in a generally circular or semicircular pattern, or in a generally rectangular or semi-rectangular pattern. The tubes 240 can include bends or arcuate sections as desired to alter the flow path and change residence time.

The mass flow rate through the tubes 240 also can be controlled by placing a valve downstream from the solar receiver. The valve can be any device capable of changing the mass flow rate of particles through the solar receiver. Exemplary valve structures include rotary valves, butterfly valves, slide gate valves, or venturi-type orifice structures. An exemplary valve structure that could be used to control mass flow rate through the solar receiver is shown in FIG. 11. As shown, the valve structure 300 comprises an orifice plate 310 having a reduced diameter compared to the inlet pipe 320 is held in place by a carrier ring 330. The size and geometry of the orifice in the orifice plate 310 can vary and will depend in part on the desired mass flow rate through the solar receiver. As shown, the orifice can include at least one tapered portion. Typically, an orifice plate 310 of a specific size and geometry will be selected during initial system design in order to achieve a desired mass flow rate of particles through the receiver.

Particle residence times in the solar receiver, meaning the time during which the particles reside in the portion of the solar receiver receiving solar radiation, will be determined in part based on the desired exit temperature of the particles. Exemplary particle resident times include about 2 to about 30 seconds, such as about 5 to about 20 seconds (e.g., about 6 to about 15 seconds). Exemplary temperatures of the particles exiting the solar receiver can exceed about 800° C. (e.g., exceeding about 1000° C., exceeding about 1200° C., or exceeding about 1500° C.).

Figure 6:
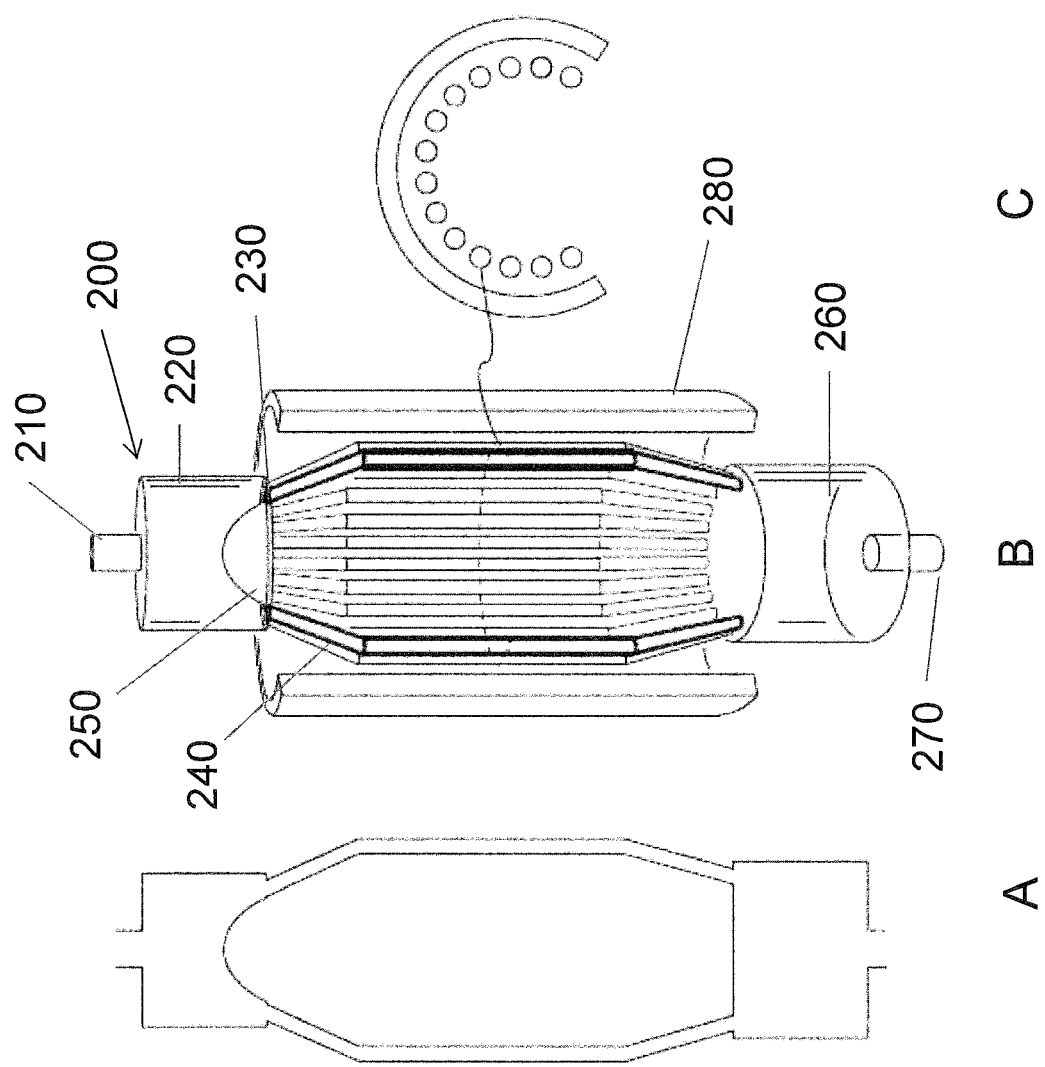
Figure 9:
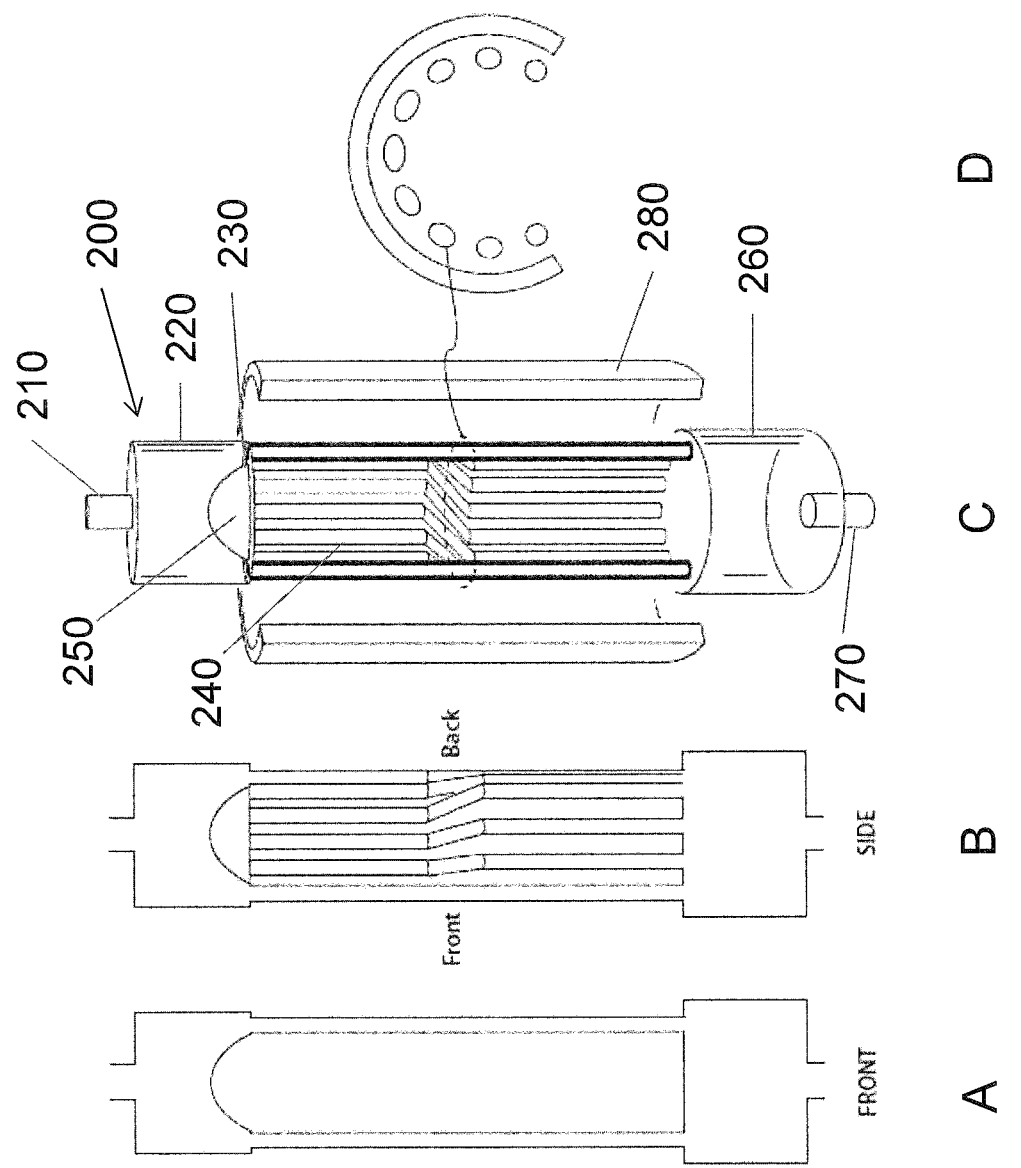
Figure 10:
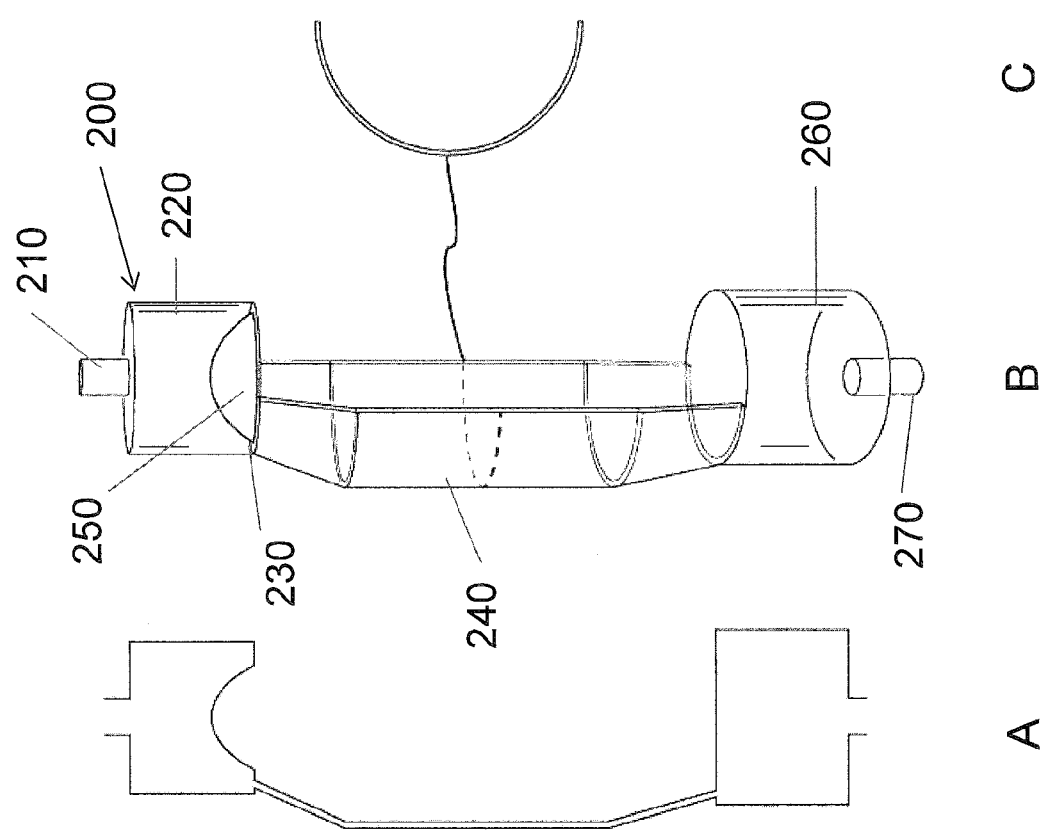

FIGS. 4-10 give several non-limiting examples of receiver configurations where various tube parameters, such as shape, number, arrangement, and flow path, are varied. Each of FIGS. 4-8 and 10 provide a side cross-sectional view (A), a perspective view (B), and a top cross-sectional view (C). FIG. 9 provides front (A) and side (B) cross-sectional views, a perspective view (C), and a top cross-sectional view (D). FIGS. 4, 5, 7, and 8 illustrate receiver designs particularly suitable for a circular solar field configuration. FIGS. 6, 9 and 10 illustrate receiver designs particularly suitable for a single south facing solar field configuration, and as shown, such embodiments can include an outer shell 280 partially surrounding the tubes 240 without blocking solar radiation from directly reaching the tubes. As shown, exemplary receivers can use various tube configurations to reduce mass flow rate and increase residence time, such as use of helical tubular shapes (e.g., FIG. 5), use of bends in the tubes forming slanted tube portions, particularly centrally located slanted tube portions (e.g., FIGS. 7 and 9). Alternatively, to achieve relatively high mass flow rates, the configuration of FIG. 4, 6, 8, or 10 could be used, wherein each tube has a first slanted portion, a central straight portion (i.e., vertical portion), and a second slanted portion at the end.

Materials of construction useful for the solar receiver and any other portion of the system that will contact the HTF particles at or near peak operating temperature can be any material having the necessary temperature and chemical resistance, and such materials will depend in part on the desired operating temperature for the system. In certain embodiments, austenitic nickel-chromium-based alloys such as INCONEL® alloys (available from Special Metals Corporation) or similar materials can be used, with specific materials including INCONEL® 600, INCONEL® 601, INCONEL® 601GC, INCONEL® 603XL, INCONEL® 617, INCONEL® 625, INCONEL® 625LCF, INCONEL® 686, INCONEL® 690, INCONEL® 693, INCONEL® 706, INCONEL® 718, INCONEL® 722, INCONEL® 725, INCONEL® 740, INCONEL® X-750, INCONEL® 751, INCONEL® MA754, INCONEL® MA758, and the like.

Alternatively, surface coatings on more conventional materials of construction could be used in the high temperature areas. Electroplating has long been used to harden surfaces and to improve wear resistance. One possible electroplating candidate, TiAlN, possesses good hardness and oxidation resistance up to about 800° C. $TiB_2$ is another refractory material with an unusually high thermal conductivity and oxidation resistance up to approximately 1000° C.

As noted in optional step 40 of FIG. 1, the ability to store significant amounts of thermal energy using the particle-based HTF also enables coupling of a wide range of solar chemistry applications to the CSP system of the invention. As used herein, reference to "thermochemical" applications encompasses any chemical reaction sufficiently exothermic or endothermic such that the use of a HTF is necessary or desired in order to transfer heat into or out of the reaction. Exemplary chemical processes that could benefit from thermal energy transfer using the HTF of the invention include nuclear fission or fusion, thermo-catalytic or steam reforming of natural gas to produce syngas, gasification of biomass to produce syngas, a sulfur-iodine cycle, a zinc-zinc oxide cycle, an iron oxide (e.g., $FeO/Fe_2O_3$) cycle, hydrocarbon or fluorocarbon cracking, and the like. Any thermochemical system, particularly including electrochemical cell systems, requiring high temperature (e.g., greater than 800° C.) could benefit from the heat transfer capabilities of the HTF material of the invention.

Another potential application for the HTF material of the invention is use in light metal production. Light metals (e.g., Al, Mg, Ti) are produced industrially by a diverse range of processes, with high-temperature and energy-intensive conditions as a commonality. Energy sources used in such processes are typically derived from fossil-fuels, including burning coal or natural gas for direct process heating, or indirectly through the electric grid.

Al production begins with alumina (the aluminum precursor), typically produced by the Bayer Process. Al is then produced by electrolysis in a molten-salt bath, at a temperature of 950 to 980° C. by the Hall-Heroult process. The cell is typically protected from corrosion by a frozen layer of cryolite. The heat loss through this layer is one of the energy sources that could be replaced using the HTF of the invention.

Regarding Mg, there are two primary methods of production. The Pidgeon process is nonelectrolytic and involves three major steps where emissions could be reduced. The first and last steps, in particular, offer potential integration with the HTF material of the invention. The Pidgeon process steps are:

1. Production of pure MgO from dolomite, an ore of $MgCa(CO_3)_2$ in a calcination furnace;
2. Production of ferrosilicon from scrap steel, sand, and carbon by electric arc ($Fe+SiO_2+C \rightarrow FeSi+CO_2$); and
3. Reduction of MgO with ferrosilicon ($3MgO+FeSi \rightarrow 3Mg+SiO_2+FeO$) at a temperature of ca. 1100° C.

The Mg produced is a vapor and is easily separated from the other products and reactants. This conventional process step has a low efficiency due to the energy losses from coal-fired heating.

The Kroll process is the dominate route to produce Ti. Titanium production involves a series of high-temperature steps with at least the first three steps being amenable to integration with the HTF material of the invention. First, $TiCl_4$ is produced from a reaction with $TiO_2$, $Cl_2$, and C (coke) in a fluidized-bed reactor at 1000° C. Next, $TiCl_4$ is reduced by Mg in a retort (800 to 900° C.), followed by purification by vacuum distillation at 700 to 1000° C. The Armstrong process (Cristal Metals) for making Ti powder is a promising alternative to the Kroll process. The reduction of $TiCl_4$ occurs in molten sodium at 200 to 300° C. Additional process steps, including high-temperature sintering at 1000° C., which could be integrated with the HTF material and system of the invention. The FFC Cambridge process is an electrolytic Ti production process at 900 to 1100° C.

FIG. 12 provides a schematic of an exemplary CSP system integrated with a light metal production process. As shown, HTF particles in the system are heated in a tubular receiver (such as those discussed above) by focused solar energy from a heliostat field to, for example, over about 1200° C. The hot HTF particles are stored in an insulated tank below the receiver for a period of time, such as about 7 to 9 hours. The particles are then gravity-fed through a lock-hopper system so that a working fluid can be heated under pressure in the heat exchanger. Operating under pressure will reduce the system piping sizes and improve heat transfer. The working-fluid is heated in the particle-to-working-fluid heat exchanger, which could be for example, a moving bed or Torbed® heat exchanger. The advantage of the Torbed® heat exchanger is that the size of the heat exchanger is reduced, requiring a smaller particle inventory. The particles then leave the heat exchanger through a second lock-hopper system so that the particles are returned to atmospheric pressure and transported back to the top of the solar tower (e.g., via bucket conveying or particle fluidization) and reheated in the solar receiver. The working fluid is then transported to the light metals process.

An exemplary lock hopper system suitable for use with the system described in FIG. 12 is shown in FIG. 13. It is noted that the illustrated lock hopper system is not limited to use with light metals processes. Instead, a lock hopper system can be used in any application where it is desirable to efficiently transfer heat from the HTF particles to a secondary HTF, particularly a gaseous secondary HTF. For example, in a Brayton cycle using the inventive HTF, the HTF particles can heat pressurized air in the exemplified lock hopper system. The exemplary lock hopper system 400 can include a lock hopper structure located at each of the feed and the discharge of the particle-to-working-fluid heat exchanger 410. The gas-solid heat exchanger used with the lock hopper system can vary, and can be any heat exchanger designed to efficiently mix a gas with solid material, typically at elevated pressure. An exemplary heat exchanger is based on the Torbed® technology available from Torftech Energy Ltd. See, also, the heat gas-solid heat exchangers described in Shimizu et al., Development of gas-solid direct contact heat exchanger by use of axial flow cyclone, International Journal of Heat and Mass Transfer, Volume 47, Issue 21, October 2004, 4601-4614.

In one embodiment, the top or feed hopper 420 receives hot particles (typically through gravity feed) from a storage tank, and the particles are typically at atmospheric pressure. The next hopper 430 is the working lock hopper. During loading of the working lock hopper 430, a valve 440 between the working lock hopper and the heat exchanger 410 is closed. After the working lock hopper 430 is filled to the desired level from the feed hopper 420, the valve 450 above the working lock hopper is closed, and the bottom valve 440 is opened, pressurizing the working lock hopper 430 and allowing particles to fall into the heat exchanger 410. The operating pressure for the gas-solid heat exchanger can vary and will depend, in part, on the process in which the working fluid will be utilized (e.g. light metal production, Brayton cycle, and the like). The operating pressure will typically exceed atmospheric pressure (e.g., greater than about 150 kPa) and will often greatly exceed atmospheric pressure.

After the particles are exhausted from the working lock hopper 430, the valve 440 between the heat exchanger 410 and the working lock hopper is again closed, the working lock hopper is depressurized, and the cycle repeated. When particles are flowing from the working lock hopper 430 into the particle-to-working-fluid heat exchanger 410, cold particles can also flow out the bottom of the heat exchanger through an open valve 460 between the bottom of the heat exchanger and the bottom lock hopper 470. The bottom lock hopper 470 discharges particles into the particle-return system only when the top valve 460 of the bottom lock hopper is closed and the bottom lock hopper is depressurized (typically back to atmospheric pressure). Following depressurization, cold HTF particles in the bottom lock hopper 470 can be fed (typically by gravity feed) into a storage tank or can be recycled back to the top of the tower in the CSP system. As shown, the lock hopper system 400 can include particulate filters 480 positioned at the secondary HTF inlet 490 and at the secondary HTF exit 500 of the heat exchanger 410 to prevent particle loss.

Although a lock-hopper system requires discontinuous operation, this is typically not a problem because the residence times of the particles in the high-temperature storage tank can be designed to be relatively long by using a large tank volume for the storage vessel (e.g., a volume of 50,000 m$^3$ or higher) and large daily particle throughput rates in the solar receiver (e.g., with a solar input time of about 7 to 9 hours). By design, the residence time of particles in the particle-to-working-fluid heat exchanger can be much shorter.

FIG. 14 illustrates specific exemplary temperatures in the system shown in FIG. 12 utilized for Mg production involving a Mg reduction step in the Pidgeon process. Thermal energy from a working fluid (e.g., compressed air) replaces the coal-fired heat used in conventional Mg processes.

III. Further Applications

Although the focus of this application is on HTF used in the context of CSP systems, it will be appreciated that the particles disclosed herein could be used as a HTF in a variety of other contexts, particularly where high temperatures are required that exceed the thermal stability limits of conventional HTF materials. Exemplary industrial uses include nuclear reactors (e.g., as a coolant fluid), paint production, food processing, plastics and textile manufacturing, chemical synthesis, and other energy storage applications such as fuel cells, including, without limitation, phosphoric acid fuel cells, molten carbonate fuel cells (MCFC), solid oxide fuel cells (SOFC), and alkaline fuel cells (AFC), with particular preferred embodiments including solid oxide fuel cells/electrolyzers and alkaline fuel cells/electrolyzers.

With respect to FIG. 1, the thermochemical reactor in step 40 can be viewed as interchangeable with other devices that can benefit from a heat source such as the HTF material of the invention, including fuel cells, electrolyzers, thermoelectric generators, and the like. For example, in a fuel cell application, the HTF of the invention could be used to provide additional heat to the fuel cell to improve performance and efficiency of the device. In an electrolyzer application, electricity generated by the heat engine discussed above could be used in the electrolyzer, and in addition, the HTF of the invention could be used to run the electrolyzer at a higher temperature for improved device performance and efficiency.

EXAMPLES

Example 1

Particle Size Distribution Before and after Annealing Nanopowder

This example illustrates the effects of elevated temperature (i.e., 800° C.) on the size distribution of boron carbide, silicon carbide, and tungsten oxide nanopowders. Approximately 1-10 g of nanopowder were placed in an alumina vessel, and heated in furnace with air as the atmosphere. Each sample was heated at a ramp rate of 10° C./min up to 800° C. and the temperature was maintained for 2.5 hrs. After which, the samples were allowed to cool to room temperature. Nanopowder samples taken before and after annealing were analyzed by TEM. Particle size distributions were unchanged by annealing in samples of B$_4$C and SiC, whereas the WO$_3$ increased, possibly due to sintering. The particle size data for each sample is set forth in Table 2 below.

TABLE 2

| Particle Size Data | | |
|---|---|---|
| Sample | Heat Treatment | Particle Size Range |
| B$_4$C | Not annealed | 10-100 nm |
| B$_4$C | Annealed | 10-100 nm |
| SiC | Not annealed | 10-100 nm |
| SiC | Annealed | 10-100 nm |
| WO$_3$ | Not annealed | 10-100 nm |
| WO$_3$ | Annealed | 200-2000 nm |

Example 2

Evaluation of Powder Flowability Before and after Annealing Nanopowder

This example illustrates use of the angle of repose measurement to characterize the flow properties of boron carbide and fumed silica powders. Approximately 10 g of boron carbide or fumed silica (Aerosil® 200) were placed in an alumina vessel, and heated in furnace with air as the atmosphere. Each sample was heated at a ramp rate of 10° C./min up to 800° C., and the temperature was maintained for 2.5 h. After which, the samples were allowed to cool back to room temperature.

The angle of repose ($\alpha$) was measured on the annealed and non-annealed samples. The measurement involved pouring 5-10 g of powder through a glass funnel into a 50 mL glass beaker. The nanopowder mound was photographed. This procedure was repeated >15 times per sample. The angle of repose in each image was measured using Adobe Photoshop. Averages of angle of repose were calculated for each sample. In general, an $\alpha$ of about 40° or less can indicate a free-flowing material. See Fatah, N. (2009). "Study and comparison of micronic and nanometric powders: Analysis of physical, flow and interparticle properties of powders" *Powder Technology* 190: 41-47. Commercially available food grade powders, Fiber Powder (Kroger, Cincinnati, Ohio) and All-Purpose Flour (Gold Medal, Minneapolis, Minn.) were also evaluated for comparison to the nanomaterials.

Results are set forth in FIG. 15. Error bars are the standard error of the mean. The heat treatment improved the flowability of the boron carbide nanopowder. The average angle of repose decreased from 46.7 to 36.9° after annealing. Oxidation of the boron carbide may have contributed to the change in flowability. In comparison, the flow properties of fumed silica (silicon dioxide) were not affected by the heat treatment in air. The $\alpha$ value for fumed silica is also less than 40°. The inset is a representative image of the measurement of $\alpha$ for a powder.

Example 3

Flow Properties Before and after Annealing Microparticles (1 Day Cycle)

This example illustrates the effects of elevated temperatures (i.e., 1000° C.) on the density and flow properties of two samples of bauxite particles (manufactured by Saint-Gobain), three samples of aluminum oxide particles (available from Union Process), and yttria-stabilized zirconia particles (available from Union Process). Details of the properties of these particles are listed in Table 3 below. Diameter ratio was obtained by calculating the average ratio of the minimum and maximum particle diameter for 50 particles using SEM micrographs.

TABLE 3

Particle Properties

| Sample ID | Average Particle Diameter[a] (mm) | Diameter Ratio | Purity[a] |
|---|---|---|---|
| bauxite-A | 0.33 | Not determined | 80% alumina |
| bauxite-B | 0.47 | 0.92 | 80% alumina |
| alumina-A | 0.5 | 0.97 | 94% alumina |
| alumina-B | 0.5 | 0.98 | 99.5% alumina |
| alumina-C | 1.0 | 0.97 | 99.5% alumina |
| zirconia | 0.5 | 0.98 | 95% yttria-stabilized zirconia |

[a]supplied by manufacturer

Approximately 50 g of particles of each sample were placed in an alumina vessel, and heated in furnace with air as the atmosphere. Each sample was heated at a ramp rate of 10° C./min up to 1000° C. and the temperature was maintained for 14 hours. After which, the samples were allowed to cool to room temperature.

The densities of the particles were characterized by two methods. Firstly, particles were poured into a 10 mL graduated cylinder and weighed. The poured particle density was calculated (mass/volume). In a second test, the graduated cylinder filled with particles was tapped repeatedly for approximately 10 seconds to allow for settling. The tapped particle density was calculated (mass/volume). The 14 hr anneal at 1000° C. caused minimal changes to particle densities; all density measurements after the heat treatment were within 10% of the original value as shown in FIGS. 16 and 17. The yttria-stabilized zirconia was 1.6-1.7 times denser than the other samples.

The ability of the tested particles to flow was characterized using the Hall flow meter, the Carney funnel, and the angle of repose tests. The Hall and Carney funnels (available from ACuPowder, Union, N.J.) have standardized dimensions, such as a 30° cone angle. The Hall flow meter test measures the time to empty 50 g of particles through the funnel (ASTM B 213). Samples that could not flow through the Hall funnel were reported in the figures as t=0 s. The instrument was calibrated using Chinese emery grit (average time 40.0 sec) prior to tests. A similar test was performed for the Carney funnel, which has a larger opening than the Hall funnel, 0.20" and 0.10", respectively. The Carney funnel was also evaluated with the emery grit (average time 8.0 s). The procedure for the angle of repose is described in Example 1.

FIG. 18 illustrates the Hall flow meter test results. Error bars are the standard error of the mean (approximately the column outline thickness or not shown if smaller than the datum symbol). The flow times through the Hall flow meter varied and were affected by the particle size, composition, and heat treatment. The flow times of the yttria-stabilized zirconia were at least 20 seconds faster than the other samples. Alumina-A (94% purity) flowed more slowly than alumina-B (99%). In addition, alumina-C, which has an average diameter of 1 mm, did not flow through the Hall funnel. Bauxite-B did not flow through the funnel after the heat treatment. Furthermore, the flow time of zirconia increased by ~14% after heating.

FIG. 19 illustrates the Carney funnel test results. Error bars are the standard error of the mean (approximately the column outline thickness or not shown if smaller than the datum symbol). All of the particles flowed through the Carney funnel. In particular, bauxite-B and alumina-C were the slowest of the samples (flow time >10 s). The flow rate trends were consistent with the Hall flow meter results: zirconia>alumina-B>alumina-A>bauxite-A>bauxite-B>alumina-C. All flow times after the heat treatment were within 0.5 s of the control (no anneal).

Shown in FIG. 20, the angle of repose values of the annealed samples remained within 3° of the control group (no heat treatment), and all samples were below 40°. Error bars are the standard error of the mean.

Example 4

Flow Properties Before and after Annealing Microparticles (4 Day Cycle)

This example illustrates the effects of thermal cycling over multiple days on the density and flow properties of bauxite, aluminum oxide, and yttria-stabilized zirconia.

Approximately 50 g of particles were placed in an alumina vessel, and heated in furnace with air as the atmosphere. Each sample was heated at a ramp rate of 10° C./min up to 200° C. and the temperature was maintained for 5-6 hours. The furnace temperature was raised to 1000° C., at a ramp rate of 10° C./min, and maintained isothermally for 14 hours. This sequence was repeated three (3) more times and then held at 200° C. for 5-6 hours before being cooled to room temperature.

The 4 day thermal cycling caused minimal changes in particle densities; all density measurements after the heat treatment were within 10% of the original value. These data are shown in FIGS. 21 and 22.

FIG. 23 illustrates the Hall flow meter test results. Error bars are the standard error of the mean (approximately the column outline thickness or not shown if smaller than the datum symbol). Zero time measurements indicate the sample did not flow through the funnel. The flow times through the Hall flow meter varied and were again affected by the particle size, composition, and heat treatment. The flow times of the yttria-stabilized zirconia were at least 20 seconds faster than the other samples. Alumina-A (94% purity) flowed more slowly than alumina-B (99%). In addition, alumina-C, which has an average diameter of 1 mm, did not flow through the Hall funnel. Bauxite-B did not flow through the funnel after the heat treatment. Furthermore, the flow time of zirconia increased by ~14% after heating.

FIG. 24 illustrates the Carney funnel test results. Error bars are the standard error of the mean (approximately the column outline thickness or not shown if smaller than the datum symbol). All of the particles flowed through the Carney funnel. In particular, bauxite-B and alumina-C were the slowest of the samples (flow time >10 s). The flow rate trends were consistent with the Hall flow meter results: zirconia>alumina-B>alumina-A>bauxite-A>bauxite-B>alumina-C. All flow times after the heat treatment were within 0.5 s of the control (no anneal).

Shown in FIG. 25, the angle of repose values of the annealed samples remained within 2° of the control group (no heat treatment), and all samples were below 40°. Error bars are the standard error of the mean.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A heat transfer system comprising:
   i) a tubular receiver positioned to receive heat from a heat source, the receiver comprising one or more enclosed tubes configured for gravity-driven flow of a particulate heat transfer fluid therethrough in a dense, unfluidized state having a particle volume fraction of at least about 25%; and
   ii) at least one storage vessel containing at least a portion of the particulate heat transfer fluid, the storage vessel in fluid communication with the tubular receiver and positioned to receive the heat transfer fluid therefrom, wherein the particulate heat transfer fluid comprises a plurality of particles of a metal-containing material having a melting point of greater than 800° C., the heat transfer fluid being substantially free of a liquid component.

2. The heat transfer system of claim 1, wherein the heat source is a solar heat source, a nuclear reactor, or a cement kiln.

3. The heat transfer system of claim 1, wherein the heat source is a solar heat source comprising a plurality of heliostats positioned to concentrate solar energy on the tubes of the tubular receiver.

4. The heat transfer system of claim 1, wherein the particles have a melting point of greater than 1500° C.

5. The heat transfer system of claim 1, wherein the metal of the metal-containing material is selected from the group consisting of a transition metal, an earth metal, a metalloid, a post-transition metal, and combinations thereof.

6. The heat transfer system of claim 1, wherein the metal of the metal-containing material is selected from the group consisting of silicon, tin, titanium, aluminum, zinc, iron, nickel, manganese, magnesium, calcium, strontium, barium, copper, silver, tungsten, niobium, molybdenum, vanadium, zirconium, tantalum, boron, thorium, uranium, and combinations thereof.

7. The heat transfer system of claim 1, wherein the metal-containing material is in a form selected from the group consisting of borides, carbides, nitrides, oxides, carbonitrides, silicides, sulfides, and combinations thereof.

8. The heat transfer system of claim 1, wherein the particles are bauxite, aluminum oxide, or yttria-stabilized zirconia.

9. The heat transfer system of claim 1, wherein the particles are microparticles having an average primary particle size of about 100 µm to about 500 µm.

10. The heat transfer system of claim 1, wherein the particles are characterized by one or more of the following:
    (a) time through Hall flow meter of less than about 65 seconds for 50 grams;
    (b) time through Carney flow meter of less than about 12 seconds for 50 grams;
    (c) angle of repose (a) of about 40 degrees or less; and
    (d) diameter ratio of greater than about 0.90.

11. The heat transfer system of claim 1, wherein the one or more tubes comprise a helical or slanted portion.

12. The heat transfer system of claim 1, wherein the tubular receiver comprises a feed manifold positioned to receive the particulate heat transfer fluid and distribute the particulate heat transfer fluid to the tubes, and a collection manifold positioned to receive the particulate heat transfer fluid exiting the tubes.

13. The heat transfer system of claim 12, wherein the one or more tubes comprise a plurality of tubes positioned to receive particulate heat transfer fluid from a series of apertures spaced around the periphery of the feed manifold, and wherein the feed manifold further comprises a convex structure centrally located within the feed manifold to urge flow of the particulate heat transfer fluid toward the series of apertures.

14. The heat transfer system of claim 1, further comprising a valve positioned downstream from the tubular receiver configured to control the mass flow rate of the particulate heat transfer fluid through the tubular receiver.

15. The heat transfer system of claim 14, wherein the valve comprises a venturi-type orifice plate.

16. The heat transfer system of claim 1, wherein the particulate heat transfer fluid further comprises an inert gas.

17. The heat transfer system of any one of claims 1 to 16, further comprising a heat engine in fluid communication with the particulate heat transfer fluid and configured to convert heat energy received from the particulate heat transfer fluid into one or more of mechanical energy and electric energy.

18. The heat transfer system of claim 17, wherein the heat engine comprises a steam turbine or a thermoelectric generator.

19. The heat transfer system of claim 1, further comprising at least one heat exchanger in fluid communication with the particulate heat transfer fluid and configured to transfer heat from the particulate heat transfer fluid to a second fluid.

20. The heat transfer system of claim 19, wherein the second fluid is selected from the group consisting of water, steam, helium, carbon dioxide, and air.

21. The heat transfer system of claim 19, wherein the heat exchanger is a gas-solid heat exchanger configured to transfer heat from the particulate heat transfer fluid to a pressurized gas, the heat transfer system further comprising:
    a feed lock hopper positioned to receive the particulate heat transfer fluid in a heated state and at atmospheric pressure;
    a working lock hopper positioned to receive the particulate heat transfer fluid from the feed lock hopper and pressurize the particulate heat transfer fluid for entry into the gas-solid heat exchanger; and
    a bottom lock hopper positioned to receive the heat transfer fluid from the gas-solid heat exchanger and depressurize the particulate heat transfer fluid.

22. The heat transfer system of claim 1, further comprising at least one thermochemical reactor in fluid communication with the particulate heat transfer fluid and configured to transfer heat from the particulate heat transfer fluid to the thermochemical reactor.

23. The heat transfer system of claim 22, wherein the thermochemical reactor is configured to perform a chemical reaction selected from the group consisting of solar thermochemical reforming of natural gas to produce syngas, gasification of biomass to produce syngas, a sulfur-iodine cycle, a zinc-zinc oxide cycle, an iron oxide cycle, water splitting, $CO_2$ reduction, light metals production, and hydrocarbon or fluorocarbon cracking.

24. The heat transfer system of claim 1, further comprising at least one high temperature fuel cell in fluid communication with the particulate heat transfer fluid, the heat transfer system configured to transfer heat from the particulate heat transfer fluid to the fuel cell.

25. The heat transfer system of claim 24, wherein the fuel cell is a solid oxide fuel cell, an alkaline fuel cell, a phosphoric acid fuel cell, or a molten salt fuel cell.

26. The heat transfer system of claim 1, further comprising at least one electrolyzer in fluid communication with the particulate heat transfer fluid, the heat transfer system configured to transfer heat from the particulate heat transfer fluid to the electrolyzer.

27. The heat transfer system of claim 26, wherein the electrolyzer is a solid oxide electrolyzer, a molten salt electrolyzer, or an alkaline electrolyzer.

28. The heat transfer system of claim 1, wherein the heat transfer system is a concentrated solar power system, wherein the tubular receiver is a solar receiver positioned to receive heat from a plurality of heliostats positioned to concentrate solar energy on the receiver, and further comprising at least one device selected from the group consisting of a heat engine, a thermochemical reactor, a fuel cell, and an electrolyzer in fluid communication with the particulate heat transfer fluid such that heat energy received from the particulate heat transfer fluid is converted into one or more of mechanical energy, electric energy, or chemical energy.

29. The heat transfer system of claim 28, wherein the heat transfer system is configured to store the particulate heat transfer fluid as a thermal storage medium such that heat from the particulate heat transfer fluid can be transferred to the device in the absence of solar energy.

30. A method for transferring heat comprising:
  i) providing at least one storage vessel containing a particulate heat transfer fluid, the heat transfer fluid comprising a plurality of particles of a metal-containing material having a melting point of greater than 800° C., the heat transfer fluid being substantially free of a liquid component;
  ii) conveying the particulate heat transfer fluid from the storage vessel to an inlet of a tubular receiver positioned to receive heat from a heat source, the tubular receiver comprising one or more enclosed tubes; and
  iii) flowing the particulate heat transfer fluid by gravity feed through the enclosed tubes in a dense, unfluidized state, the particulate heat transfer fluid having a particle volume fraction of at least about 25% during said flowing step, the particulate heat transfer fluid absorbing heat from the heat source during said flowing step.

31. The method of claim 30, further comprising:
  iv) conveying a heated particulate heat transfer fluid from step iii) to a at least one device selected from the group consisting of a heat engine, a thermochemical reactor, a fuel cell, and an electrolyzer in fluid communication with the heat transfer fluid such that heat energy received from the heat transfer fluid is converted into one or more of mechanical energy, electric energy, and chemical energy; and
  v) recovering a cooled particulate heat transfer fluid from the device and recycling the cooled particulate heat transfer fluid for reheating by the heat source.

32. The method of claim 31, wherein the device is a heat engine configured to convert heat energy received from the particulate heat transfer fluid into one or more of mechanical energy and electric energy.

33. The method of claim 32, wherein the heat engine comprises a steam turbine or a thermoelectric generator.

34. The method of claim 31, wherein the device comprises at least one heat exchanger configured to transfer heat from the particulate heat transfer fluid to a second fluid.

35. The method of claim 34, wherein the second fluid is selected from the group consisting of water, steam, helium, carbon dioxide, and air.

36. The method of claim 34, wherein the heat exchanger is a gas-solid heat exchanger configured to transfer heat from the particulate heat transfer fluid to a pressurized gas and the device further comprises a lock hopper system, the method further comprising:
  conveying the heated particulate heat transfer fluid at atmospheric pressure to a feed lock hopper;
  conveying the heated particulate heat transfer fluid from the feed lock hopper to a working lock hopper in fluid communication with the gas-solid heat exchanger;
  pressurizing the heated particulate heat transfer fluid in the working lock hopper;
  conveying the heated and pressurized particulate heat transfer fluid to the gas-solid heat exchanger;
  conveying a cooled particulate heat transfer fluid from the gas-solid heat exchanger to a bottom lock hopper; and
  depressurizing the cooled particulate heat transfer fluid in the bottom lock hopper.

37. The method of claim 31, wherein the device is a thermochemical reactor configured to perform a chemical reaction selected from the group consisting of solar thermochemical reforming of natural gas to produce syngas, gasification of biomass to produce syngas, a sulfur-iodine cycle, a zinc-zinc oxide cycle, an iron oxide cycle, water splitting, $CO_2$ reduction, light metals production, and hydrocarbon or fluorocarbon cracking.

38. The method of claim 31, wherein the device is a fuel cell selected from the group consisting of a solid oxide fuel cell, an alkaline fuel cell, a phosphoric acid fuel cell, and a molten salt fuel cell.

39. The method of claim 31, wherein the device is an electrolyzer selected from the group consisting of a solid oxide electrolyzer, a molten salt electrolyzer, and an alkaline electrolyzer.

40. The method of claim 30, wherein the heat source is a solar heat source, a nuclear reactor, or a cement kiln.

41. The method of claim 30, wherein the heat source is a solar heat source comprising a plurality of heliostats positioned to concentrate solar energy on the tubes of the tubular receiver.

42. The method of claim 41, further comprising storing the heated particulate heat transfer fluid as a thermal storage medium such that heat from the particulate heat transfer fluid can be transferred in the absence of solar energy.

43. The method of claim 30, wherein the particles have a melting point of greater than 1500° C.

44. The method of claim 30, wherein the metal of the metal-containing material is selected from the group consisting of a transition metal, an earth metal, a metalloid, a post-transition metal, and combinations thereof.

45. The method of claim 30, wherein the metal of the metal-containing material is selected from the group consisting of silicon, tin, titanium, aluminum, zinc, iron, nickel, manganese, magnesium, calcium, strontium, barium, copper, silver, tungsten, niobium, molybdenum, vanadium, zirconium, tantalum, boron, thorium, uranium, and combinations thereof.

46. The method of claim 30, wherein the metal-containing material is in a form selected from the group consisting of borides, carbides, nitrides, oxides, carbonitrides, silicides, sulfides, and combinations thereof.

47. The method of claim 30, wherein the particles are bauxite, aluminum oxide, or yttria-stabilized zirconia.

48. The method of claim 30, wherein the particles comprise microparticles having an average primary particle size of about 100 μm to about 500 μm.

49. The method of claim 30, wherein the particles are characterized by one or more of the following:
 (e) time through Hall flow meter of less than about 65 seconds for 50 grams;
 (f) time through Carney flow meter of less than about 12 seconds for 50 grams;
 (g) angle of repose (a) of about 40 degrees or less; and
 (h) diameter ratio of greater than about 0.90.

50. The method of claim 30, wherein the one or more tubes comprise a helical or slanted portion.

51. The method of claim 30, wherein the tubular receiver comprises a feed manifold positioned to receive the particulate heat transfer fluid and distribute the particulate heat transfer fluid to the one or more tubes and a collection manifold positioned to receive the particulate heat transfer fluid exiting the one or more tubes.

52. The method of claim 51, wherein the one or more tubes comprise a plurality of tubes positioned to receive particulate heat transfer fluid from a series of apertures spaced around the periphery of the feed manifold, and wherein the feed manifold further comprises a convex structure centrally located within the feed manifold to urge flow of the particulate heat transfer fluid toward the series of apertures.

53. The method of claim 30, further comprising a valve positioned downstream from the tubular receiver adapted for control of mass flow rate of the particulate heat transfer fluid through the tubular receiver.

54. The method of claim 53, wherein the valve comprises a venturi-type orifice plate.

55. The method of claim 30, wherein the particulate heat transfer fluid further comprises an inert gas.

* * * * *